US011965900B2

(12) United States Patent
Day et al.

(10) Patent No.: US 11,965,900 B2
(45) Date of Patent: Apr. 23, 2024

(54) INDICATING A STATUS OF AN ANALYTICAL INSTRUMENT ON A SCREEN OF THE ANALYTICAL INSTRUMENT

(71) Applicant: Wyatt Technology, LLC, Goleta, CA (US)

(72) Inventors: Vivianna Day, Goleta, CA (US); Jeremy W. Jarrett, Buellton, CA (US); Shiva K. Ramini, Thousand Oaks, CA (US); Barbara R. Maurer, San Jose, CA (US); Michael I. Larkin, Santa Barbara, CA (US); Stephen C. Minne, Santa Barbara, CA (US)

(73) Assignee: Wyatt Technology, LLC, Goleta, CA (US)

( * ) Notice: Subject to any disclaimer, the term of this patent is extended or adjusted under 35 U.S.C. 154(b) by 1402 days.

(21) Appl. No.: 16/186,449

(22) Filed: Nov. 9, 2018

(65) Prior Publication Data
US 2020/0150137 A1 May 14, 2020

(51) Int. Cl.
*G01N 35/00* (2006.01)

(52) U.S. Cl.
CPC . *G01N 35/00722* (2013.01); *G01N 35/00623* (2013.01); *G01N 2035/0091* (2013.01)

(58) Field of Classification Search
CPC ......... G01N 15/0211; G01N 2035/009; G01N 2035/0091; G01N 35/00623; G01N 35/00712; G01N 35/00722
See application file for complete search history.

(56) References Cited

U.S. PATENT DOCUMENTS

| 4,463,598 A | 8/1984 | Haney |
| 5,269,937 A | 12/1993 | Dollinger et al. |

(Continued)

FOREIGN PATENT DOCUMENTS

| CN | 101038293 A | 9/2007 |
| CN | 101290320 A | 10/2008 |

(Continued)

OTHER PUBLICATIONS

Javed S. Shaikh and Nutan N. Rao. Troubleshooting and maintenance of highperformance liquid chromatography—A Review. World J Pharm Sci 2017; 5(12): 162-169 (Year: 2017).*

(Continued)

*Primary Examiner* — Michael J Dalbo
(74) *Attorney, Agent, or Firm* — Schmeiser, Olsen & Watts LLP; Leonard Guzman

(57) ABSTRACT

The present disclosure describes a method, a system, and a computer program product of indicating a status of an analytical instrument on a screen of the analytical instrument. In an embodiment, the method, the system, and the computer program product include receiving data from an analytical instrument monitoring a liquid sample, segmenting the received data into data segments for at least two characteristics of at least one of the instrument, the sample, and an operating environment of the instrument, analyzing each of the data segments for the at least two characteristics, retrieving threshold values for the at least two characteristics from a computer data source, calculating at least one status of at least one of the instrument, the sample, and the operating environment, with respect to the analyzed data segments and the threshold values, and displaying the at least one status on a display of the instrument.

17 Claims, 26 Drawing Sheets

(56) References Cited

U.S. PATENT DOCUMENTS

| | | | | |
|---|---|---|---|---|
| 5,416,580 | A * | 5/1995 | Trainer | G01N 15/0211 356/336 |
| 5,528,366 | A * | 6/1996 | Shortt | G01N 30/8624 356/344 |
| 5,966,676 | A | 10/1999 | Fujiwara et al. | |
| 6,175,409 | B1 * | 1/2001 | Nielsen | G01N 30/60 356/337 |
| 6,377,341 | B1 * | 4/2002 | Rowlen | G01N 21/41 356/128 |
| 6,519,033 | B1 * | 2/2003 | Quist | G01N 15/14 356/337 |
| 2003/0127609 | A1 | 7/2003 | El-Hage et al. | |
| 2006/0176486 | A1 * | 8/2006 | Ho | F23N 5/082 356/436 |
| 2008/0245133 | A1 * | 10/2008 | Titterton | G01N 11/08 73/54.01 |
| 2009/0252749 | A1 * | 10/2009 | Leister | A61P 37/00 530/391.1 |
| 2012/0042214 | A1 | 2/2012 | Jacobs et al. | |
| 2012/0299928 | A1 | 11/2012 | Shikhman | |
| 2013/0024130 | A1 | 1/2013 | Zahniser | |
| 2014/0033793 | A1 * | 2/2014 | Thorson | G01N 33/0006 73/1.02 |
| 2014/0140595 | A1 * | 5/2014 | Fomitchov | G01N 21/6458 382/128 |
| 2014/0172316 | A1 | 6/2014 | Vandersleen et al. | |
| 2014/0207017 | A1 * | 7/2014 | Gilmore | A61B 5/389 600/546 |
| 2016/0089047 | A1 | 3/2016 | Jonnada et al. | |
| 2016/0370394 | A1 * | 12/2016 | Cembrowski | G01N 35/00623 |
| 2017/0010213 | A1 | 1/2017 | Jingu et al. | |
| 2018/0178261 | A1 | 6/2018 | Perkins et al. | |

FOREIGN PATENT DOCUMENTS

| | | |
|---|---|---|
| CN | 103278654 A | 9/2013 |
| EP | 0505564 B1 | 1/1997 |
| EP | 2818848 A1 | 12/2014 |
| JP | S59160740 A | 9/1984 |
| JP | S63172943 U | 11/1988 |
| JP | 2003329570 A | 11/2003 |
| JP | 2005128029 A | 5/2005 |
| JP | 2012149903 A | 8/2012 |
| JP | 2013174506 A | 9/2013 |
| JP | 2014521939 A | 8/2014 |
| JP | 2016040528 A | 3/2016 |
| JP | 2019531488 A | 10/2019 |
| JP | 2020512451 A | 4/2020 |
| WO | 1996034291 A1 | 10/1996 |
| WO | 2015118668 A1 | 8/2015 |
| WO | 2018033648 A1 | 3/2017 |
| WO | 2017132483 A1 | 8/2017 |
| WO | 2018050527 | 3/2018 |
| WO | 2018169738 | 9/2018 |

OTHER PUBLICATIONS

GAINES "Spectral Interference: Types, Avoidance and Correction" Inorganic Ventures, 2023, https://www.inorganicventures.com/icp-guide/spectral-interference :- types-avoidance-and-correction.

"Instrument Zero and Span Calibration" Plc Scada Courses - Engineers Community, Inst Tools, 2017, https://instrumentationtools.com/instrument-calibration/.

International Search Report and Written Opinion in PCT/US2019/060651 mailed on Jan. 29, 2020.

Busnel, et al. "Multiangle Light Scattering and Viscometric Detector for Size-Exclusion Chromatography" Journal de Physique III, 5, Oct. 1995, pp. 1501-1512.

Extended Search Report in European Patent Application No. 19881516.9 mailed on Jul. 7, 2022.

* cited by examiner

US 11,965,900 B2

INDICATING A STATUS OF AN ANALYTICAL INSTRUMENT ON A SCREEN OF THE ANALYTICAL INSTRUMENT

BACKGROUND

The present disclosure relates to analytical instruments, and more specifically, to indicating a status of an analytical instrument on a screen of the analytical instrument.

SUMMARY

The present disclosure describes a computer implemented method, a system, and a computer program product of indicating a status of an analytical instrument on a screen of the analytical instrument. In an exemplary embodiment, the computer implemented method, the system, and the computer program product include (1) receiving, by a computer system, data from at least one analytical instrument monitoring at least one liquid sample, (2) executing, by the computer system, a set of logical operations segmenting the received data into data segments for at least two characteristics of at least one of the at least one instrument, the at least one sample, and at least one operating environment of the at least one instrument, (3) executing, by the computer system, a set of logical operations analyzing each of the data segments for the at least two characteristics, resulting in analyzed data segments, (4) retrieving, by the computer system, threshold values for the at least two characteristics from a computer data source, (5) calculating, by the computer system, at least one status of at least one of the at least one instrument, the at least one sample, and the at least one operating environment, with respect to the analyzed data segments and the threshold values, and (6) displaying, by the computer system, the at least one status on at least one display of the at least one instrument.

DETAILED DESCRIPTION

Figure 1A:
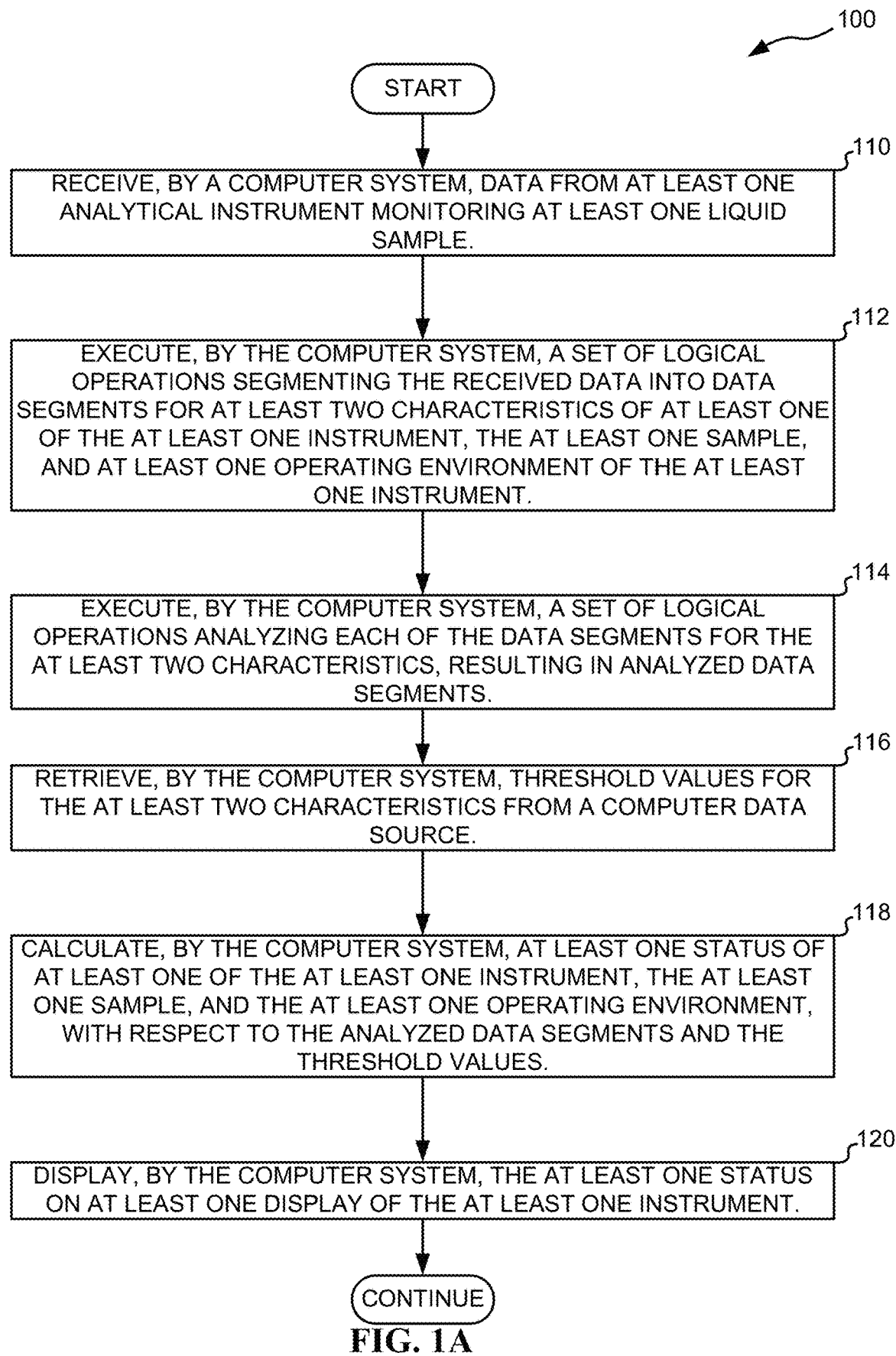
FIG. 1A depicts a flowchart in accordance with an exemplary embodiment.

The present disclosure describes a computer implemented method, a system, and a computer program product of indicating a status of an analytical instrument on a screen of the analytical instrument. In an exemplary embodiment, the computer implemented method, the system, and the computer program product include (1) receiving, by a computer system, data from at least one analytical instrument monitoring at least one liquid sample, (2) executing, by the computer system, a set of logical operations segmenting the received data into data segments for at least two characteristics of at least one of the at least one instrument, the at least one sample, and at least one operating environment of the at least one instrument, (3) executing, by the computer system, a set of logical operations analyzing each of the data segments for the at least two characteristics, resulting in analyzed data segments, (4) retrieving, by the computer system, threshold values for the at least two characteristics from a computer data source, (5) calculating, by the computer system, at least one status of at least one of the at least one instrument, the at least one sample, and the at least one operating environment, with respect to the analyzed data segments and the threshold values, and (6) displaying, by the computer system, the at least one status on at least one display of the at least one instrument. In an alternative embodiment, the computer implemented method, the system, and the computer program product include (1) receiving, by a computer system, data from at least one analytical instrument monitoring at least one liquid sample, (2) executing, by the computer system, a set of logical operations segmenting the received data into data segments for at least one characteristic of at least one of the at least one instrument, the at least one sample, and at least one operating environment of the at least one instrument, (3) executing, by the computer system, a set of logical operations analyzing each of the data segments for the at least one characteristic, resulting in analyzed data segments, (4) retrieving, by the computer system, threshold values for the at least one characteristic from a computer data source, (5) calculating, by the computer system, at least one status of at least one of the at least one instrument, the at least one sample, and the at least one operating environment, with respect to the analyzed data segments and the threshold values, and (6) displaying, by the computer system, the at least one status on at least one display of the at least one instrument. In an embodiment, the computer data source is a computer storage device. In an embodiment, the computer data source is a computer keyboard. In an embodiment, the computer data source is a keypad on the at least one instrument.

In an embodiment, the received data indicates at least one alarm state from the at least one instrument. Examples of the at least one alarm state include a fluid leak, the presence of organic vapor, overpressure, valve malfunction, pressure sensor malfunction, over temperature, and light source too dim.

Definitions

Particle

A particle may be a constituent of a liquid sample aliquot. Such particles may be molecules of varying types and sizes, nanoparticles, virus like particles, liposomes, emulsions, bacteria, and colloids. These particles may range in size on the order of nanometer to microns.

Analysis of Macromolecular or Particle Species in Solution

The analysis of macromolecular or particle species in solution may be achieved by preparing a sample in an appropriate solvent and then injecting an aliquot thereof into a separation system such as a liquid chromatography (LC) column or field flow fractionation (FFF) channel where the different species of particles contained within the sample are separated into their various constituencies. Once separated, generally based on size, mass, or column affinity, the samples may be subjected to analysis by means of light scattering, refractive index, ultraviolet absorption, electrophoretic mobility, and viscometric response.

Light Scattering

Light scattering (LS) is a non-invasive technique for characterizing macromolecules and a wide range of particles in solution. The two types of light scattering detection frequently used for the characterization of macromolecules are static light scattering and dynamic light scattering.

Dynamic Light Scattering

Dynamic light scattering is also known as quasi-elastic light scattering (QELS) and photon correlation spectroscopy (PCS). In a DLS experiment, time-dependent fluctuations in the scattered light signal are measured using a fast photodetector. DLS measurements determine the diffusion coefficient of the molecules or particles, which can in turn be used to calculate their hydrodynamic radius.

Static Light Scattering

Static light scattering (SLS) includes a variety of techniques, such as single angle light scattering (SALS), dual angle light scattering (DALS), low angle light scattering (LALS), and multi-angle light scattering (MALS). SLS experiments generally involve the measurement of the absolute intensity of the light scattered from a sample in solution that is illuminated by a fine beam of light. Such measurement is often used, for appropriate classes of particles/molecules, to determine the size and structure of the sample molecules or particles, and, when combined with knowledge of the sample concentration, the determination of weight average molar mass. In addition, nonlinearity of the intensity of scattered light as a function of sample concentration may be used to measure interparticle interactions and associations.

Multi-Angle Light Scattering

Multi-angle light scattering (MALS) is a SLS technique for measuring the light scattered by a sample into a plurality of angles. It is used for determining both the absolute molar mass and the average size of molecules in solution, by detecting how they scatter light. Collimated light from a laser source is most often used, in which case the technique can be referred to as multiangle laser light scattering (MALLS). The "multi-angle" term refers to the detection of scattered light at different discrete angles as measured, for example, by a single detector moved over a range that includes the particular angles selected or an array of detectors fixed at specific angular locations.

A MALS measurement requires a set of ancillary elements. Most important among them is a collimated or focused light beam (usually from a laser source producing a collimated beam of monochromatic light) that illuminates a region of the sample. The beam is generally plane-polarized perpendicular to the plane of measurement, though other polarizations may be used especially when studying anisotropic particles. Another required element is an optical cell to hold the sample being measured. Alternatively, cells incorporating means to permit measurement of flowing samples may be employed. If single-particles scattering properties are to be measured, a means to introduce such particles one-at-a-time through the light beam at a point generally equidistant from the surrounding detectors must be provided.

Although most MALS-based measurements are performed in a plane containing a set of detectors usually equidistantly placed from a centrally located sample through which the illuminating beam passes, three-dimensional versions also have been developed where the detectors lie on the surface of a sphere with the sample controlled to pass through its center where it intersects the path of the incident light beam passing along a diameter of the sphere. The MALS technique generally collects multiplexed data sequentially from the outputs of a set of discrete detectors. The MALS light scattering photometer generally has a plurality of detectors.

Viscometer

A capillary bridge viscometer (VIS) is an instrument used to measure the specific viscosity of a solute in a suitable solvent. The specific viscosity is defined as $\eta_{sp}=\eta/\eta_o-1$, where $\eta$ is the viscosity of the sample and $\eta_o$ is the viscosity of the solvent. As a sample is introduced into the bridge viscometer, a pressure transducer generates a signal indicative of a pressure differential. This pressure differential, combined with a predetermined internal pressure of the system, is used to calculate the specific viscosity of the sample. The specific viscosity is useful in determining the molecular parameters of a polymer including molar mass and hydrodynamic radius.

The differential pressure transducer in a capillary bridge viscometer measures the differential pressure generated across fluid arms. The instrument measures the differential pressure values continuously while flowing fluid through the system. When pure solvent flows through the system and the bridge is balanced, the differential pressure measured should be zero. Impurities in the solvent, undissolved air bubbles, electrical noise, or micro leaks in the plumbing could cause undesired noise in the differential pressure measurement, which ultimately is used to determine the specific viscosity.

Differential Refractometer

A differential refractometer (DRI), or refractive index detector (RI or RID), is a detector that measures the refractive index of an analyte relative to the solvent. They are often used as detectors for high-performance liquid chromatography and size exclusion chromatography. DRIs are considered to be universal detectors because they can detect anything with a refractive index different from the solvent, but they have low sensitivity. When light leaves one material and enters another it bends, or refracts. The refractive index of a material is a measure of how much light bends when it enters.

Differential refractometers contain a flow cell with the following two parts: one for the sample; and one for the reference solvent. The RI detector measures the refractive index of both components. When only solvent is passing through the sample component, the measured refractive index of both components is the same, but when an analyte passes through the flow cell, the two measured refractive indices are different. The difference appears as a peak in the chromatogram. Differential refractometers are often used for the analysis of polymer samples in size exclusion chromatography.

Ultraviolet-Visible Spectroscopy

Ultraviolet-visible spectroscopy or ultraviolet-visible spectrophotometry (UV-Vis or UV/Vis) refers to absorption spectroscopy or reflectance spectroscopy in the ultraviolet-visible spectral region. An ultraviolet-visible detector/ultraviolet-visible spectrophotometer uses light in the visible and adjacent ranges, where the absorption or reflectance in the visible range directly affects the perceived color of the chemicals involved, where in this region of the electromagnetic spectrum, atoms and molecules undergo electronic transitions. Such absorption spectroscopy measures transitions from the ground state to the excited state. An ultraviolet-visible detector/ultraviolet-visible spectrophotometer measures the intensity of light passing through a sample (I), and compares it to the intensity of light before it passes through the sample ($I_o$), where the ratio $I/I_o$ is called the transmittance, and is usually expressed as a percentage (% T). The absorbance, A, is based on the transmittance according to $$A = -\log(\% \, T/100\%)$$

The UV-visible spectrophotometer can also be configured to measure reflectance, where the spectrophotometer measures the intensity of light reflected from a sample (I), and compares it to the intensity of light reflected from a reference material ($I_o$), where the ratio $I/I_o$ is called the reflectance, and is usually expressed as a percentage (% R).

Noise, Wander, and Drift

Noise, wander, and drift are undesired, random disturbances/errors in measured signals over different time scales. For example, consider a sensor that measures light intensity. If a perfect light source at a fixed intensity shines on a perfect detector, the measured voltage would be constant and unchanging. However, random noise in the system could cause fluctuations in the measured voltage. Noise refers to random fluctuations that occur on the 0- to 30-second time scale, while wander describes fluctuations that occur on the 30-second to 5-minute time scale. Drift describes long-term fluctuations over the time scale of minutes. Electrical noise could include noise resulting from temperature fluctuations or pick up noise from ambient electromagnetic signals from nearby devices (e.g., with respect to a MALS instrument).

Forward Monitor

Forward monitor/forward monitor sensor is a sensor that directly measures un-scattered signal from a light source of an instrument and is placed at a 0-degree angle with respect to the direction of the laser beam/light source (e.g., for a MALS instrument). The measured response of a forward monitor is sensitive to the status of a sample in a flow cell.

Machine Learning

Machine learning is computer software/computer algorithm that can learn from and make predictions on data where such software overcomes following strictly static program instructions by making data-driven predictions or decisions, by through building a model from sample inputs. Machine learning software/algorithms devise complex models and algorithms that lend themselves to prediction, such as predictive analytics, where such analytical models allow researchers, data scientists, engineers, and analysts to produce reliable, repeatable decisions and results and uncover hidden insights through learning from historical relationships and trends in the data. Formally, a machine learning computer software/computer algorithm/computer program is said to learn from experience E with respect to some class of tasks T and performance measure P if its performance at tasks in T, as measured by P, improves with experience E.

Machine Learning Tasks

Machine learning tasks are typically classified into three broad categories, depending on the nature of the learning signal or feedback available to a machine learning software/algorithm/program. A first category is supervised learning, where the computer is presented with example inputs and their desired outputs, given by a teacher, with a goal of the computer learning a general rule that maps inputs to outputs. A second category is unsupervised learning where no labels are given to the machine learning algorithm, leaving it on its own to find structure in its input, with a goal of unsupervised learning (discovering hidden patterns in data) of feature learning. A third category is reinforcement learning where the machine learning computer program interacts with a dynamic environment in which it must perform a certain goal (such as driving a vehicle or playing a game against an opponent), where the machine learning program is provided feedback in terms of rewards and punishments as it navigates its problem space. A fourth category is semi-supervised learning, between supervised and unsupervised learning, where the teacher gives an incomplete training signal (i.e., a training set with some (often many) of the target outputs missing), where transduction is a special case of this principle where the entire set of problem instances is known at learning time, except that part of the targets is missing.

Machine learning tasks may also be categorized according to the desired output of the machine learning software/algorithm/program. For example, for machine learning with classification as the desired output, inputs are divided into two or more classes, and the learner/machine learning software must produce a model that assigns unseen inputs to one or more (multi-label classification) of these classes, where this is typically tackled in a supervised way (e.g., spam filtering, where the inputs are email (or other) messages and the classes are spam and not spam. As another example, for machine learning with regression as the desired output (a supervised problem), the outputs are continuous rather than discrete. In addition, for machine learning with clustering as the desired output, a set of inputs is to be divided into groups, where the groups are not known beforehand, making this typically an unsupervised task. Also, for machine learning with density estimation as the desired output, machine learning finds the distribution of inputs in some space. As another example, for machine learning with dimensionality reduction as the desired output, machine learning simplifies inputs by mapping them into a lower-dimensional space, where topic modeling is a related problem, where a program is given a list of human language documents and is tasked to find out which documents cover similar topics.

Machine Learning Approaches

Machine learning software/algorithms/programs operate via different approaches. For example, decision tree learning uses a decision tree as a predictive model, which maps observations about an item to conclusions about the item's target value. Also, association rule learning is a method for discovering interesting relations between variables in large databases. As another example, support vector machines (SVMs) are a set of related supervised learning methods used for classification and regression, where given a set of training examples, each marked as belonging to one of two categories, an SVM training algorithm builds a model that predicts whether a new example falls into one category or the other. Cluster analysis (unsupervised learning) is the assignment of a set of observations into subsets (called clusters) so that observations within the same cluster are similar according to some predesignated criterion or criteria, while observations drawn from different clusters are dissimilar, where different clustering techniques make different assumptions on the structure of the data, often defined by some similarity metric and evaluated for example by internal compactness (similarity between members of the same cluster) and separation between different clusters, with other methods being based on estimated density and graph connectivity.

Reinforcement learning is a machine learning approach which is concerned with how an agent ought to take actions in an environment so as to maximize some notion of long-term reward, attempting to find a policy that maps states of the world to the actions the agent ought to take in those states, where neither correct input/output pairs are presented nor sub-optimal actions are explicitly corrected. In similarity and metric learning, the machine learning software/algorithm/program is given pairs of examples that are considered similar and pairs of less similar objects and learns a similarity function (or a distance metric function) that can predict if new objects are similar.

Current Technologies

Current analytical instruments do not display status information for MALS, DRI, VIS, or MALS forward monitor indicators. Also, current instruments do not take actions based upon the status of the instruments. In addition, current instruments do not communicate remotely with users about such status.

Problems with Current Technologies

Current analytical instruments have problems that impact their data quality and data processing. For example, current instruments suffer from limited system equilibration time. In addition, current instruments experience instrument baseline noise due to systematic noise and drifting detector baselines. Also, current instruments suffer from flow cell obstructions (e.g., air bubbles). Thus, there is a need (a) to indicate when an analytical instrument/instruments in an analytical measurement system is/are ready to obtain high quality data results and (b) to provide step solutions to improve the health of an overall analytical measurement system and the health of instruments in the system.

Referring to FIG. 1A, in an exemplary embodiment, the computer implemented method, the system, and the computer program product are configured to perform an operation 110 of receiving, by a computer system, data from at least one analytical instrument monitoring at least one liquid sample, an operation 112 of executing, by the computer system, a set of logical operations segmenting the received data into data segments for at least two characteristics of at least one of the at least one instrument, the at least one sample, and at least one operating environment of the at least one instrument, an operation 114 of executing, by the computer system, a set of logical operations analyzing each of the data segments for the at least two characteristics, resulting in analyzed data segments, an operation 116 of retrieving, by the computer system, threshold values for the at least two characteristics from a computer data source, an operation 118 of calculating, by the computer system, at least one status of at least one of the at least one instrument, the at least one sample, and the at least one operating environment, with respect to the analyzed data segments and the threshold values, and an operation 120 of displaying, by the computer system, the at least one status on at least one display of the at least one instrument. In an alternative embodiment, the computer implemented method, the system, and the computer program product are configured to perform (1) an operation of receiving, by a computer system, data from at least one analytical instrument monitoring at least one liquid sample, (2) an operation of executing, by the computer system, a set of logical operations segmenting the received data into data segments for at least one characteristic of at least one of the at least one instrument, the at least one sample, and at least one operating environment of the at least one instrument, (3) an operation of executing, by the computer system, a set of logical operations analyzing each of the data segments for the at least one characteristic, resulting in analyzed data segments, (4) an operation of retrieving, by the computer system, threshold values for the at least one characteristic from a computer data source, (5) an operation of calculating, by the computer system, at least one status of at least one of the at least one instrument, the at least one sample, and the at least one operating environment, with respect to the analyzed data segments and the threshold values, and (6) an operation of displaying, by the computer system, the at least one status on at least one display of the at least one instrument.

Figure 10:
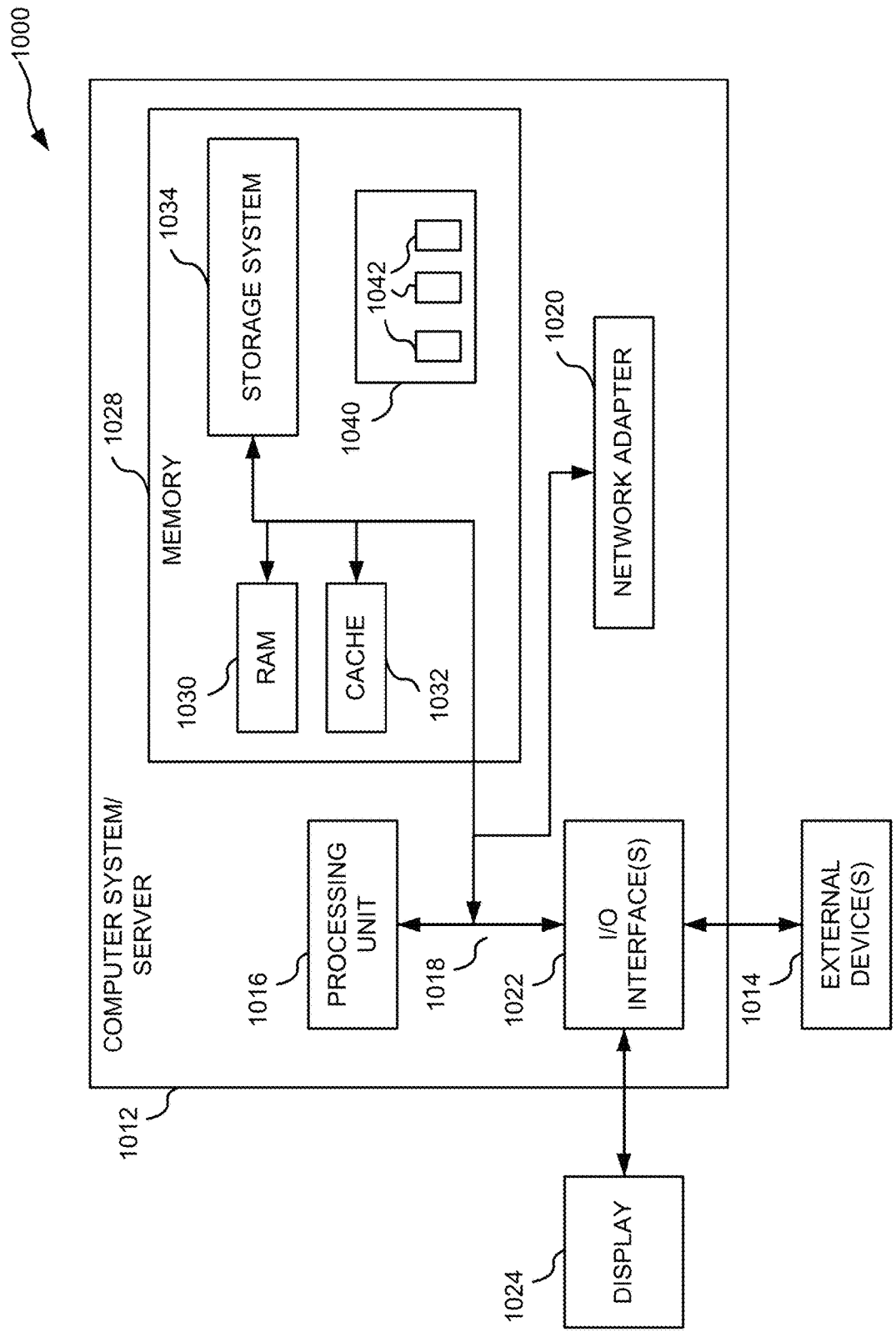
FIG. 10 depicts a computer system in accordance with an exemplary embodiment of the present invention.

In an exemplary embodiment, the computer system is a standalone computer system, such as computer system 1000 shown in FIG. 10, a network of distributed computers, where at least some of the computers are computer systems such as computer system 1000 shown in FIG. 10, or a cloud computing node server, such as computer system 1000 shown in FIG. 10. In an embodiment, the computer system is a computer system 1000 as shown in FIG. 10, that executes an indicating a status of an analytical instrument on a screen of the analytical instrument script or computer software application that carries out the operations of at least method 100. In an embodiment, the computer system is a computer system/server 1012 as shown in FIG. 10, that executes an indicating a status of an analytical instrument on a screen of the analytical instrument script or computer software application that carries out the operations of at least method 100. In an embodiment, the computer system is a processing unit 1016 as shown in FIG. 10, that executes an indicating a status of an analytical instrument on a screen of the analytical instrument script or computer software application that carries out the operations of at least method 100. In an embodiment, the computer system is a processor of the analytical instrument, that executes an indicating a status of an analytical instrument on a screen of the analytical instrument script or computer software application that carries out the operations of at least method 100.

In an embodiment, the computer system is a computer system 1000 as shown in FIG. 10, that executes an indicating a status of an analytical instrument on a screen of the analytical instrument script or computer software application that carries out at least operations 110, 112, 114, 116, 118, and 120. In an embodiment, the computer system is a computer system/server 1012 as shown in FIG. 10, that executes an indicating a status of an analytical instrument on a screen of the analytical instrument script or computer software application that carries out at least operations 110, 112, 114, 116, 118, and 120. In an embodiment, the computer system is a processing unit 1016 as shown in FIG. 10, that executes an indicating a status of an analytical instrument on a screen of the analytical instrument script or computer software application that carries out at least operations 110, 112, 114, 116, 118, and 120. In an embodiment, the computer system is a processor of the analytical instrument, that executes an indicating a status of an analytical instrument on a screen of the analytical instrument script or computer software application that carries out at least operations 110, 112, 114, 116, 118, and 120.

In an embodiment, the computer system is a machine learning computer software/program/algorithm that executes an indicating a status of an analytical instrument on a screen of the analytical instrument script or computer software application that carries out the operations of at least method 100. In an embodiment, the computer system is a machine learning computer software/program/algorithm that executes an indicating a status of an analytical instrument on a screen of the analytical instrument script or computer software application that carries out at least operations 110, 112, 114, 116, 118, and 120.

Figure 1B:
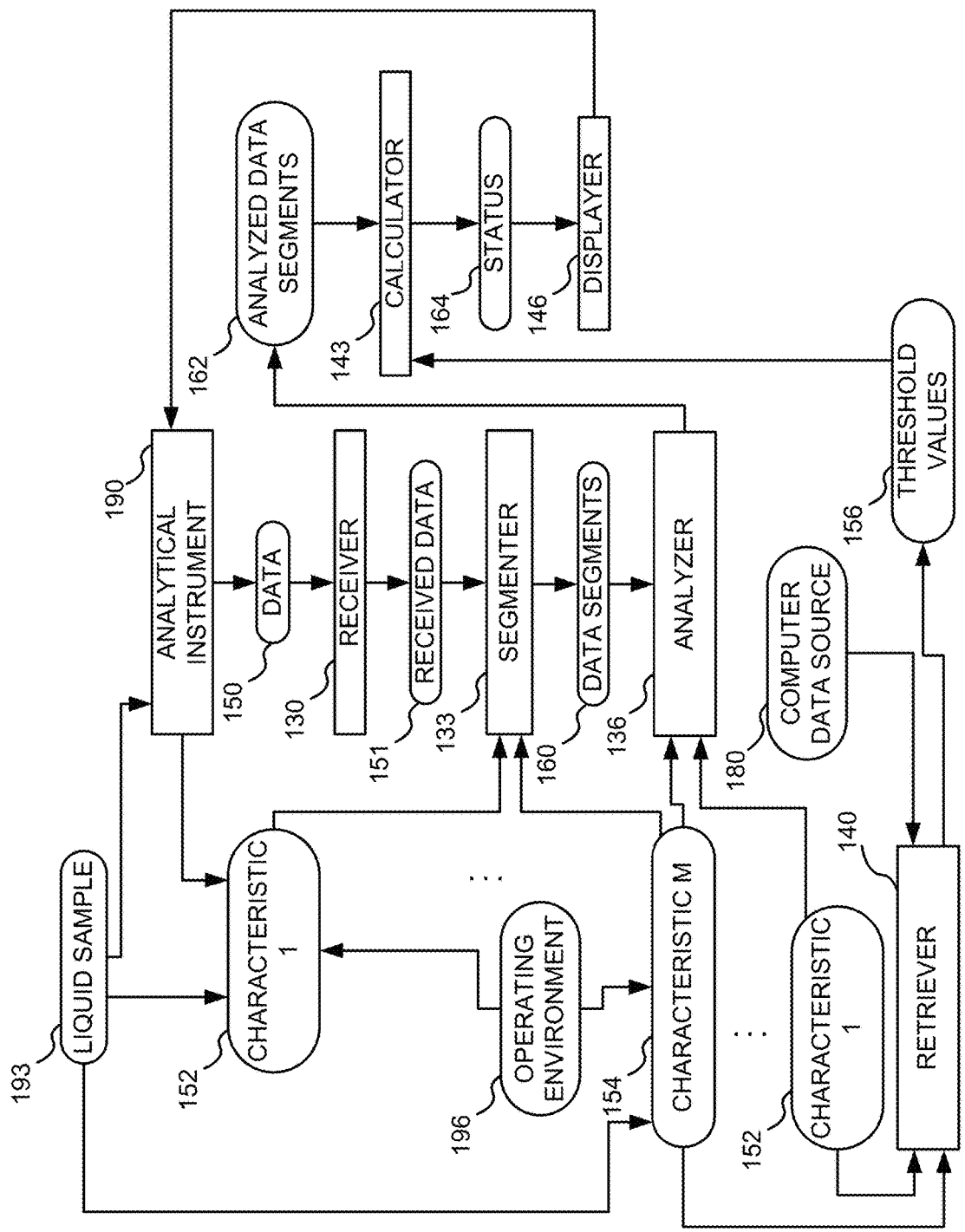
FIG. 1B depicts a block diagram in accordance with an exemplary embodiment.

Referring to FIG. 1B, in an exemplary embodiment, the computer implemented method, the system, and the computer program product includes a receiver 130, a segmenter 133, an analyzer 136, a retriever 140, a calculator 143, and a displayer 146. In an embodiment, receiver 130 is configured to receive data 150 from at least one analytical instrument 190 monitoring at least one liquid sample 193. In an embodiment, receiver 130 includes a computer system, such as computer system 1000 as shown in FIG. 10, performing operation 110. In an embodiment, receiver 130 includes a computer system, such as computer system/server 1012 as shown in FIG. 10, performing operation 110. In an embodiment, receiver 130 includes a computer system, such as processing unit 1016 as shown in FIG. 10, performing operation 110. In an embodiment, receiver 130 is a processor of the at least one analytical instrument performing operation 110. In an embodiment, receiver 130 is implemented as computer software executing on a computer system, such as computer system 1000 as shown in FIG. 10, such that the computer system performs operation 110. In an embodiment, receiver 130 is implemented as computer software executing on a computer system, such as computer system/server 1012 as shown in FIG. 10, such that the computer system performs operation 110. In an embodiment, receiver 130 is implemented as computer software executing on a computer system, such as processing unit 1016 as shown in FIG. 10, such that the computer system performs operation 110. In an embodiment, receiver 130 is implemented as computer software executing on a computer system, such as a processor of the at least one analytical instrument, such that the computer system performs operation 110. In an embodiment, receiver 130 performs operation 110 as computer software executing on a processor of receiver 130. In an embodiment, receiver 130 performs operation 110 as computer software executing on a processor of at least one analytical instrument 190. In an embodiment, receiver 130 includes a computer system, such as a machine learning computer software/program/algorithm performing operation 110.

In an embodiment, segmenter 133 is configured to execute a set of logical operations segmenting received data 151 into data segments 160 for at least two characteristics 152, 154 of at least one of at least one instrument 190, at least one sample 193, and at least one operating environment 196 of at least one instrument 190. In an embodiment, segmenter 133 includes a computer system, such as computer system 1000 as shown in FIG. 10, performing operation 112. In an embodiment, segmenter 133 includes a computer system, such as computer system/server 1012 as shown in FIG. 10, performing operation 112. In an embodiment, segmenter 133 includes a computer system, such as processing unit 1016 as shown in FIG. 10, performing operation 112. In an embodiment, segmenter 133 is a processor of the at least one analytical instrument performing operation 112. In an embodiment, segmenter 133 is implemented as computer software executing on a computer system, such as computer system 1000 as shown in FIG. 10, such that the computer system performs operation 112. In an embodiment, segmenter 133 is implemented as computer software executing on a computer system, such as computer system/server 1012 as shown in FIG. 10, such that the computer system performs operation 112. In an embodiment, segmenter 133 is implemented as computer software executing on a computer system, such as processing unit 1016 as shown in FIG. 10, such that the computer system performs operation 112. In an embodiment, segmenter 133 is implemented as computer software executing on a computer system, such as a processor of the at least one analytical instrument, such that the computer system performs operation 112. In an embodiment, segmenter 133 performs operation 112 as computer software executing on a processor of segmenter 133. In an embodiment, segmenter 133 performs operation 112 as computer software executing on a processor of at least one analytical instrument 190. In an embodiment, segmenter 133 includes a computer system, such as a machine learning computer software/program/algorithm performing operation 112. In a particular embodiment, segmenter 133 samples received data 151 at a particular acquisition frequency (e.g., 2 Hz or 2 samples per second), resulting in a particular number of samples acquired per minute (e.g., 120 samples/minute). In an embodiment, the acquisition frequency ranges from 0.001 Hz to 1 Hz.

In an embodiment, analyzer 136 is configured to execute a set of logical operations analyzing each of data segments 160 for at least two characteristics 152, 154, resulting in analyzed data segments 162. In an embodiment, analyzer 136 includes a computer system, such as computer system 1000 as shown in FIG. 10, performing operation 114. In an embodiment, analyzer 136 includes a computer system, such as computer system/server 1012 as shown in FIG. 10, performing operation 114. In an embodiment, analyzer 136 includes a computer system, such as processing unit 1016 as shown in FIG. 10, performing operation 114. In an embodiment, analyzer 136 is a processor of the at least one analytical instrument performing operation 114. In an embodiment, analyzer 136 is implemented as computer software executing on a computer system, such as computer system 1000 as shown in FIG. 10, such that the computer system performs operation 114. In an embodiment, analyzer 136 is implemented as computer software executing on a computer system, such as computer system/server 1012 as shown in FIG. 10, such that the computer system performs operation 114. In an embodiment, analyzer 136 is implemented as computer software executing on a computer system, such as processing unit 1016 as shown in FIG. 10, such that the computer system performs operation 114. In an embodiment, analyzer 136 is implemented as computer software executing on a computer system, such as a processor of the at least one analytical instrument, such that the computer system performs operation 114. In an embodiment, analyzer 136 performs operation 114 as computer software executing on a processor of analyzer 136. In an embodiment, analyzer 136 performs operation 114 as computer software executing on a processor of at least one analytical instrument 190. In an embodiment, analyzer 136 includes a computer system, such as a machine learning computer software/program/algorithm performing operation 114. In a particular embodiment, analyzer 136 analyzes the samples acquired by segmenter 133 (e.g. for a 2 Hz sampling/acquisition frequency, analyzer analyzes 120 samples/data samples in each minute of data segments 160).

In an embodiment, retriever 140 is configured to retrieve threshold values 156 for at least two characteristics 152, 154 from a computer data source 180. In an embodiment, retriever 140 includes a computer system, such as computer system 1000 as shown in FIG. 10, performing operation 116. In an embodiment, retriever 140 includes a computer system, such as computer system/server 1012 as shown in FIG. 10, performing operation 116. In an embodiment, retriever 140 includes a computer system, such as processing unit 1016 as shown in FIG. 10, performing operation 116. In an embodiment, retriever 140 is a processor of the at least one analytical instrument performing operation 116. In an embodiment, retriever 140 is implemented as computer software executing on a computer system, such as computer system 1000 as shown in FIG. 10, such that the computer system performs operation 116. In an embodiment, retriever 140 is implemented as computer software executing on a computer system, such as computer system/server 1012 as shown in FIG. 10, such that the computer system performs operation 116. In an embodiment, retriever 140 is implemented as computer software executing on a computer system, such as processing unit 1016 as shown in FIG. 10, such that the computer system performs operation 116. In an embodiment, retriever 140 is implemented as computer software executing on a computer system, such as a processor of the at least one analytical instrument, such that the computer system performs operation 116. In an embodiment, retriever 140 performs operation 116 as computer software executing on a processor of retriever 140. In an embodiment, retriever 140 performs operation 116 as computer software executing on a processor of at least one analytical instrument 190. In an embodiment, retriever 140 includes a computer system, such as a machine learning computer software/program/algorithm performing operation 116.

In an embodiment, calculator 143 is configured to calculate at least one status 164 of at least one of at least one instrument 190, at least one sample 193, and at least one operating environment 196, with respect to the analyzed data segments 162 and threshold values 156. In an embodiment, calculator 143 includes a computer system, such as computer system 1000 as shown in FIG. 10, performing operation 118. In an embodiment, calculator 143 includes a computer system, such as computer system/server 1012 as shown in FIG. 10, performing operation 118. In an embodiment, calculator 143 includes a computer system, such as processing unit 1016 as shown in FIG. 10, performing operation 118. In an embodiment, calculator 143 is a processor of the at least one analytical instrument performing operation 118. In an embodiment, calculator 143 is implemented as computer software executing on a computer system, such as computer system 1000 as shown in FIG. 10, such that the computer system performs operation 118. In an embodiment, calculator 143 is implemented as computer software executing on a computer system, such as computer system/server 1012 as shown in FIG. 10, such that the computer system performs operation 118. In an embodiment, calculator 143 is implemented as computer software executing on a computer system, such as processing unit 1016 as shown in FIG. 10, such that the computer system performs operation 118. In an embodiment, calculator 143 is implemented as computer software executing on a computer system, such as a processor of the at least one analytical instrument, such that the computer system performs operation 118. In an embodiment, calculator 143 performs operation 118 as computer software executing on a processor of calculator 143. In an embodiment, calculator 143 performs operation 118 as computer software executing on a processor of at least one analytical instrument 190. In an embodiment, calculator 143 includes a computer system, such as a machine learning computer software/program/algorithm performing operation 118. In a particular embodiment, calculator 143 calculates status 164 by comparing the samples analyzed by analyzer 136 to threshold values 156 (e.g. for a 2 Hz sampling/acquisition frequency, calculator 143 calculates status 164 by comparing 120 samples/data samples in each minute of data segments 160 to threshold values 156).

In an embodiment, displayer 146 is configured to display at least one status 164 on at least one display of at least one instrument 190. In an embodiment, displayer 146 includes a computer system, such as computer system 1000 as shown in FIG. 10, performing operation 120. In an embodiment, displayer 146 includes a computer system, such as computer system/server 1012 as shown in FIG. 10, performing operation 120. In an embodiment, displayer 146 includes a computer system, such as processing unit 1016 as shown in FIG. 10, performing operation 120. In an embodiment, displayer 146 is a processor of the at least one analytical instrument performing operation 120. In an embodiment, displayer 146 is implemented as computer software executing on a computer system, such as computer system 1000 as shown in FIG. 10, such that the computer system performs operation 120. In an embodiment, displayer 146 is implemented as computer software executing on a computer system, such as computer system/server 1012 as shown in FIG. 10, such that the computer system performs operation 120. In an embodiment, displayer 146 is implemented as computer software executing on a computer system, such as processing unit 1016 as shown in FIG. 10, such that the computer system performs operation 120. In an embodiment, displayer 146 is implemented as computer software executing on a computer system, such as a processor of the at least one analytical instrument, such that the computer system performs operation 120. In an embodiment, displayer 146 performs operation 120 as computer software executing on a processor of displayer 146. In an embodiment, displayer 146 performs operation 120 as computer software executing on a processor of at least one analytical instrument 190. In an embodiment, displayer 146 includes a computer system, such as a machine learning computer software/program/algorithm performing operation 120. In an alternative embodiment, displayer 146 is configured to display at least two status 164 on at least one display of at least one instrument 190.

Instruments and Data

Figure 2A:
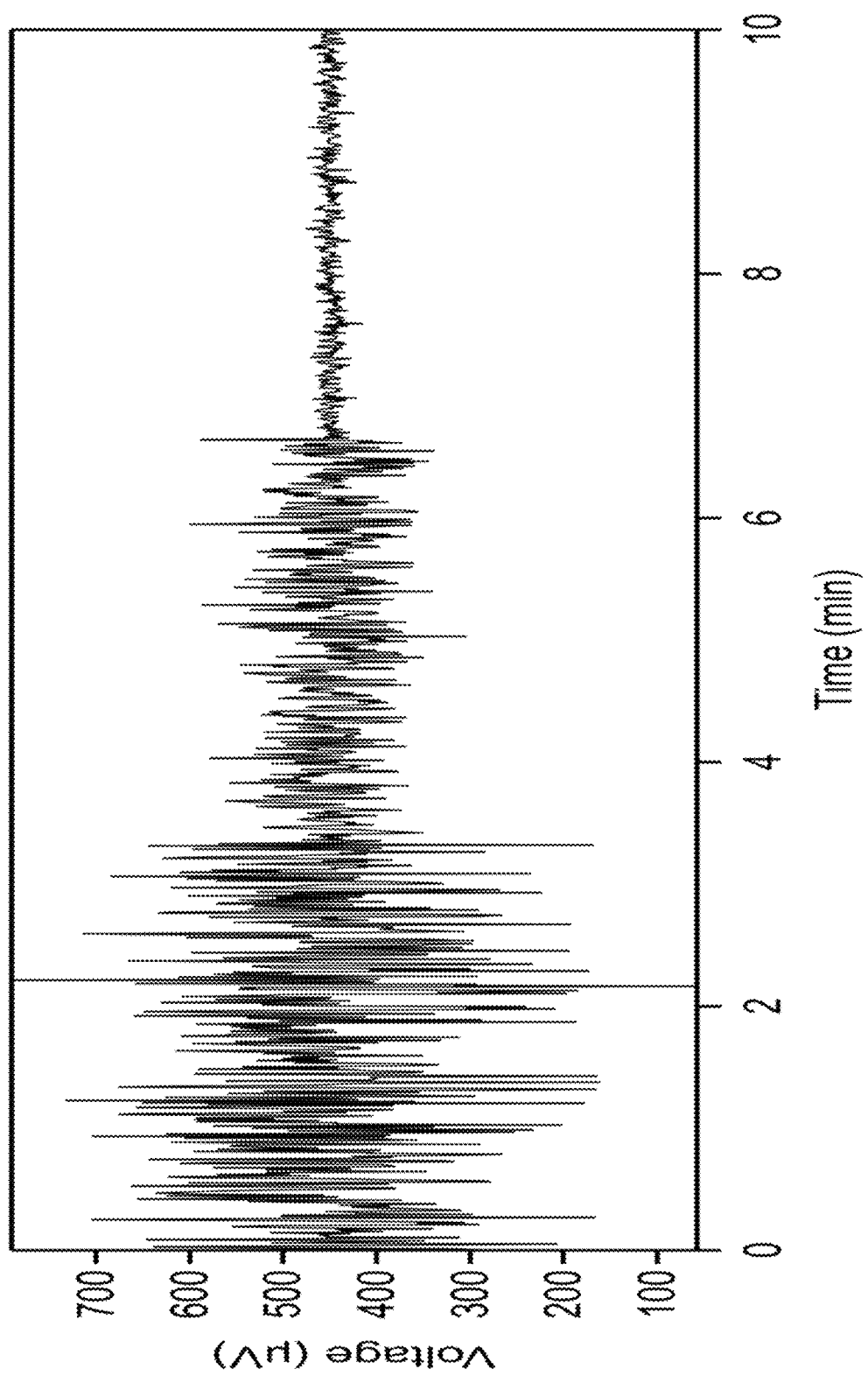
FIG. 2A depicts a graph in accordance with an embodiment.
Figure 2B:
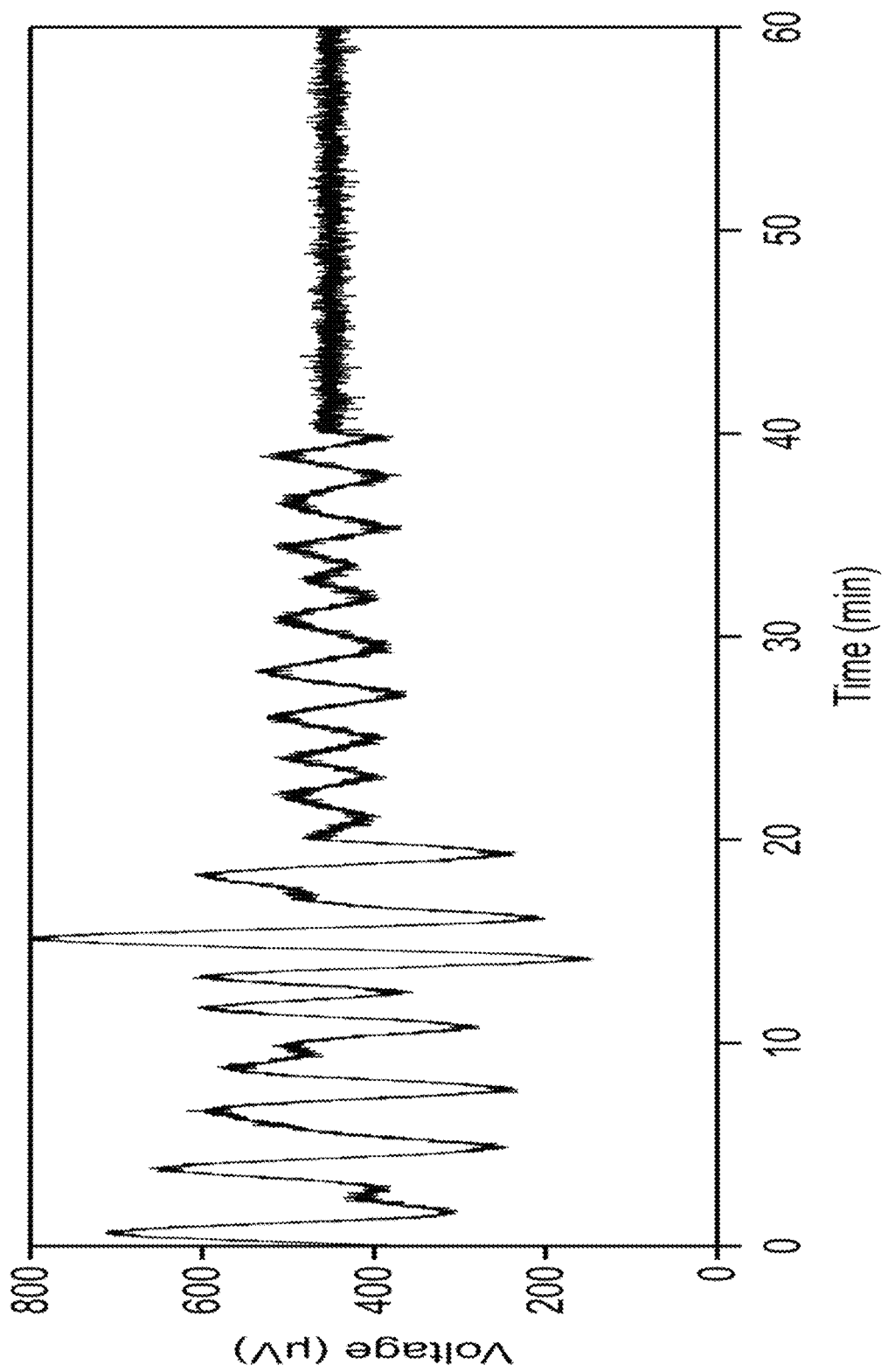
FIG. 2B depicts a graph in accordance with an embodiment.
Figure 2C:
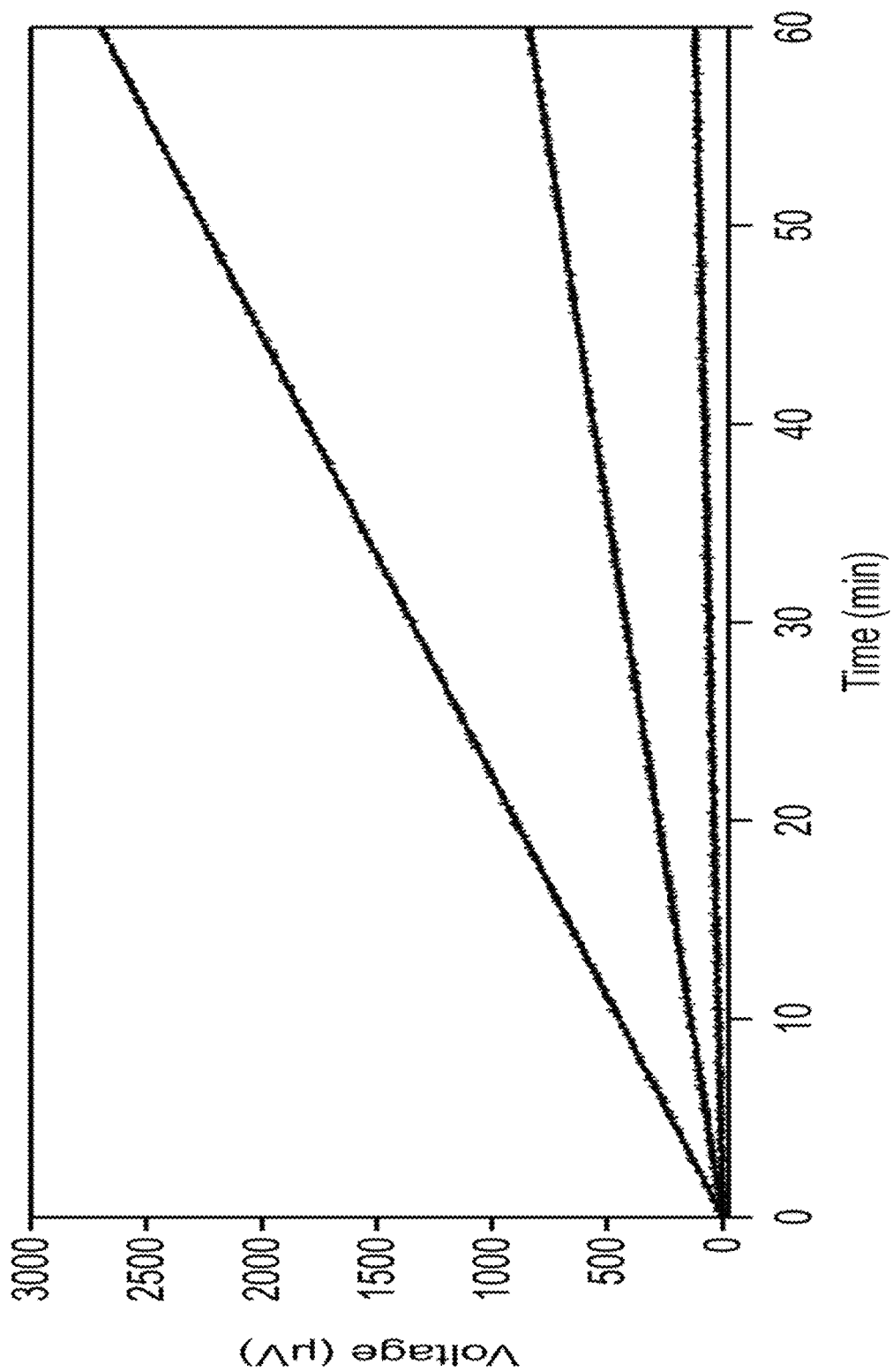
FIG. 2C depicts a graph in accordance with an embodiment.

In an embodiment, the at least one instrument includes a multi-angle light scattering (MALS) instrument, where the received data indicates time-varying light levels of scattered light, where the light levels are derived from at least one measurement of the at least one sample by the multi-angle light scattering instrument. In a specific embodiment, the at least one instrument is a multi-angle light scattering instrument, where the received data indicates time-varying light levels of scattered light, where the light levels are derived from at least one measurement of the at least one sample by the multi-angle light scattering instrument. In a particular embodiment, the received data includes time-varying light level readings from at least a 90-degree photodiode of the multi-angle light scattering instrument. In a specific embodiment, the received data are time-varying light level readings from at least a 90-degree photodiode of the multi-angle light scattering instrument. For example, the time-varying light level readings could be voltage readings from at least the 90-degree photodiode of the multi-angle light scattering instrument. In a specific example, FIG. 2A, FIG. 2B, and FIG. 2C could depict time-varying light level readings/voltage readings from the 90-degree photodiode of the multi-angle light scattering instrument.

In a particular embodiment, the received data includes time-varying light level readings from at least a 0-degree photodiode of the multi-angle light scattering instrument. In a specific embodiment, the received data are time-varying light level readings from at least a 0-degree photodiode of the multi-angle light scattering instrument. For example, the time-varying light level readings could be voltage readings from at least the 0-degree photodiode of the multi-angle light scattering instrument.

In an embodiment, the at least one instrument includes a multi-angle light scattering instrument, where the received data indicates electrical noise from the multi-angle light scattering instrument. In a specific embodiment, the at least one instrument is a multi-angle light scattering instrument, where the received data indicates electrical noise from the multi-angle light scattering instrument.

Figure 3A:
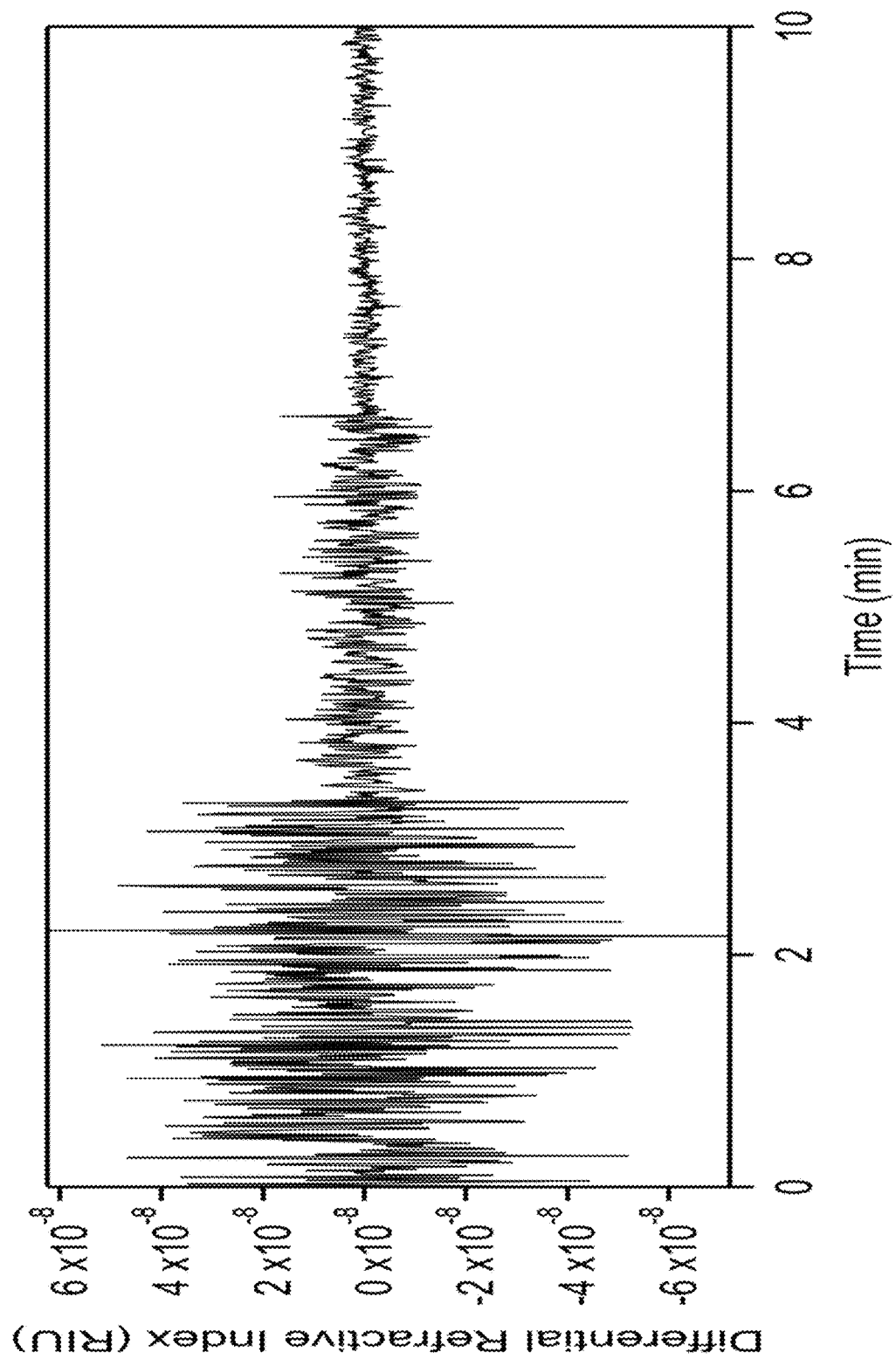
FIG. 3A depicts a graph in accordance with an embodiment.
Figure 3B:
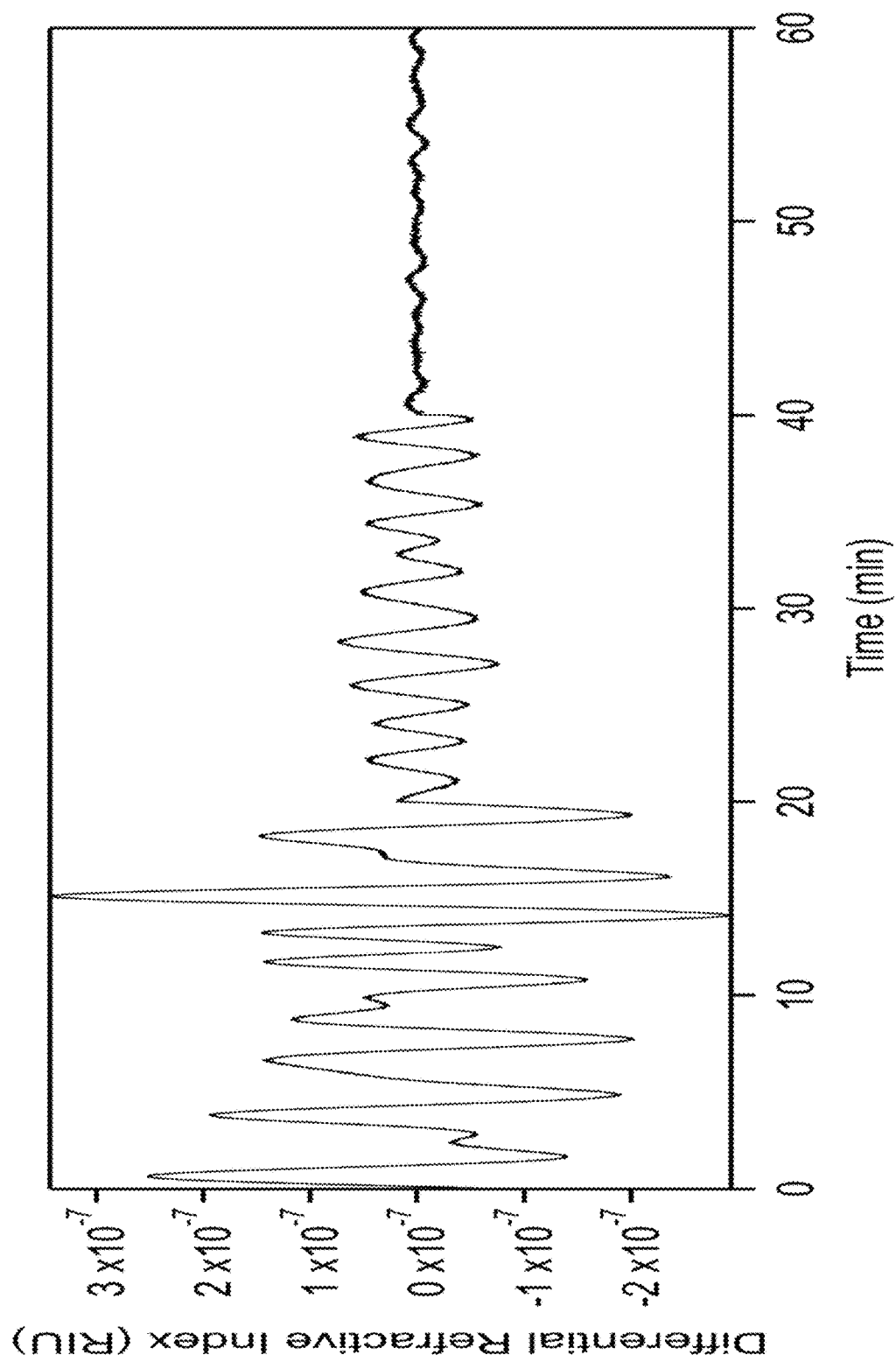
FIG. 3B depicts a graph in accordance with an embodiment.
Figure 3C:
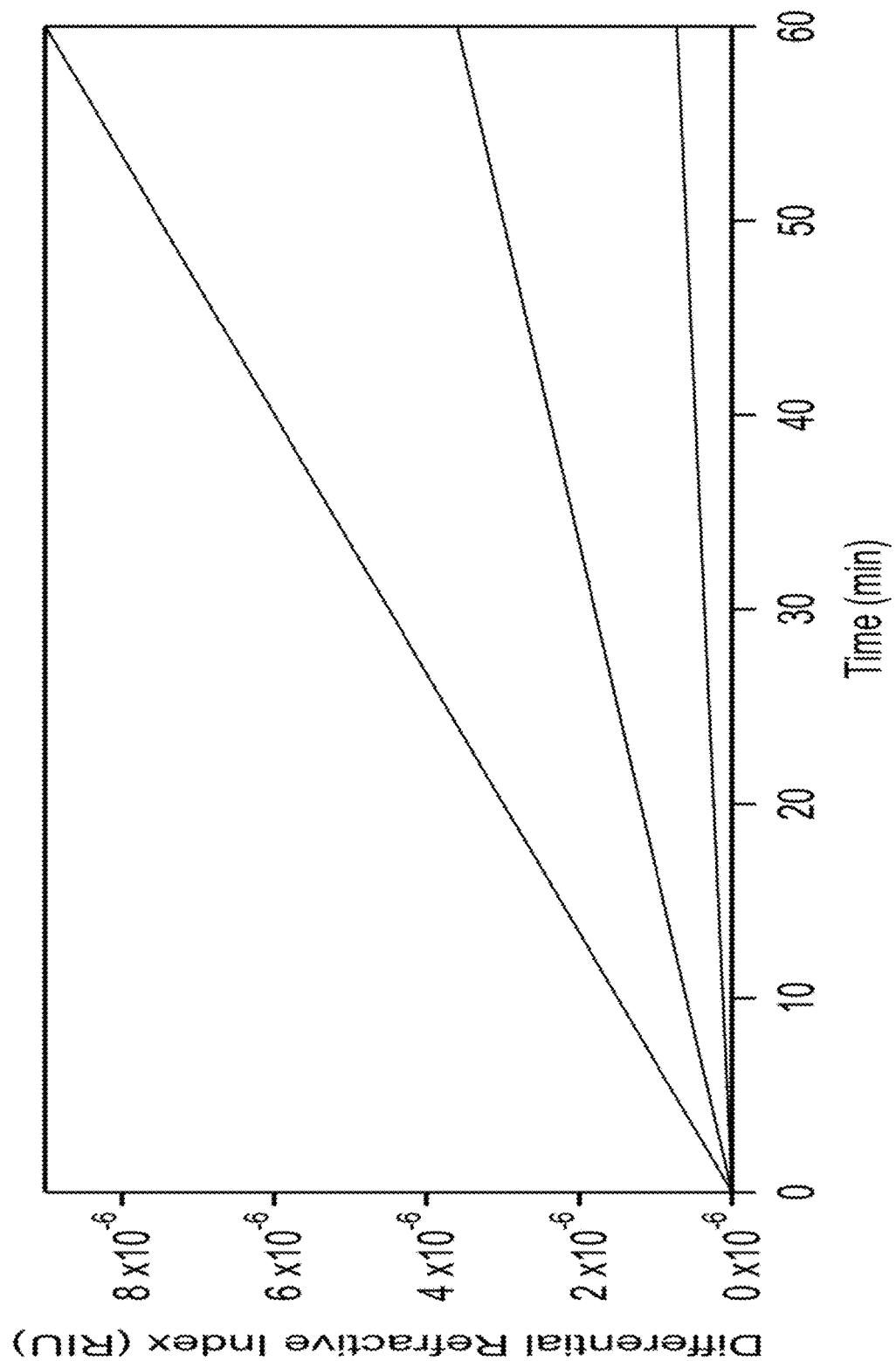
FIG. 3C depicts a graph in accordance with an embodiment.

In an embodiment, the at least one instrument includes a differential refractometer (DRI), where the received data indicates time-varying differential refractive index values, where the differential refractive index values are derived from at least one measurement of the at least one sample by the differential refractometer. In a specific embodiment, the at least one instrument is a differential refractometer, where the received data indicates time-varying differential refractive index values, where the differential refractive index values are derived from at least one measurement of the at least one sample by the differential refractometer. In a specific example, FIG. 3A, FIG. 3B, and FIG. 3C could depict time-varying differential refractive index values derived from at least one measurement of the at least one sample by the differential refractometer.

Figure 4A:
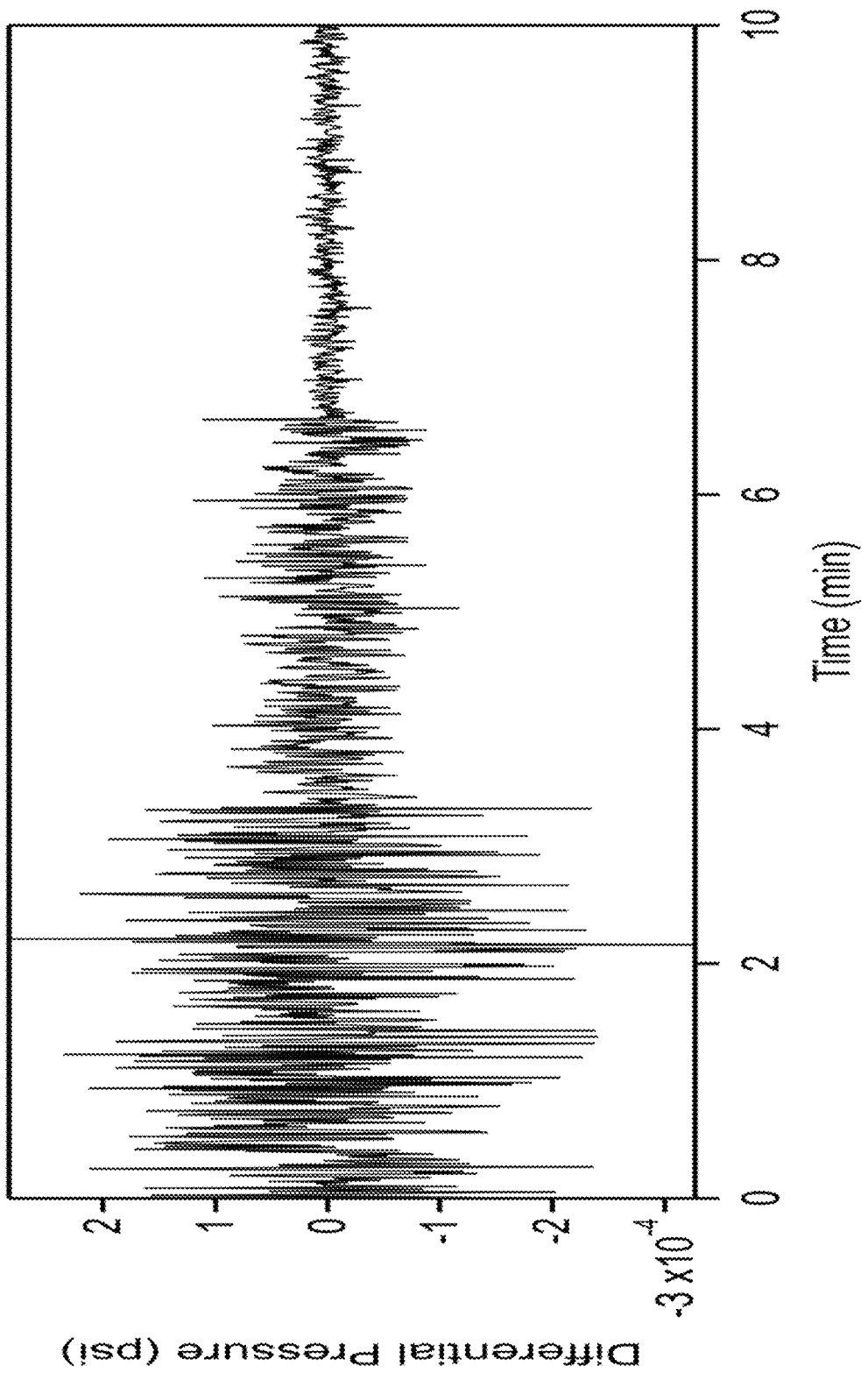
FIG. 4A depicts a graph in accordance with an embodiment.
Figure 4B:
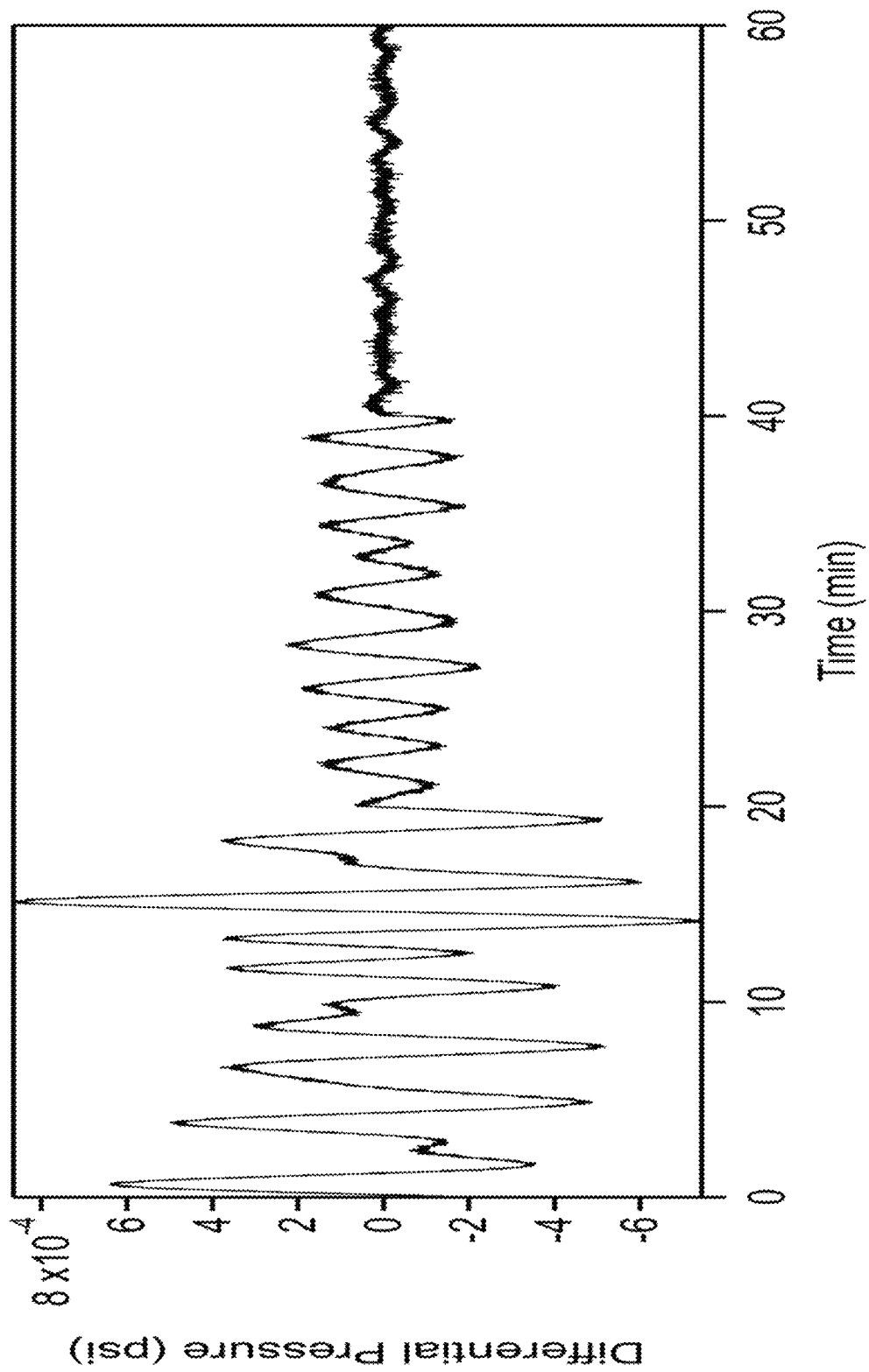
FIG. 4B depicts a graph in accordance with an embodiment.
Figure 4C:
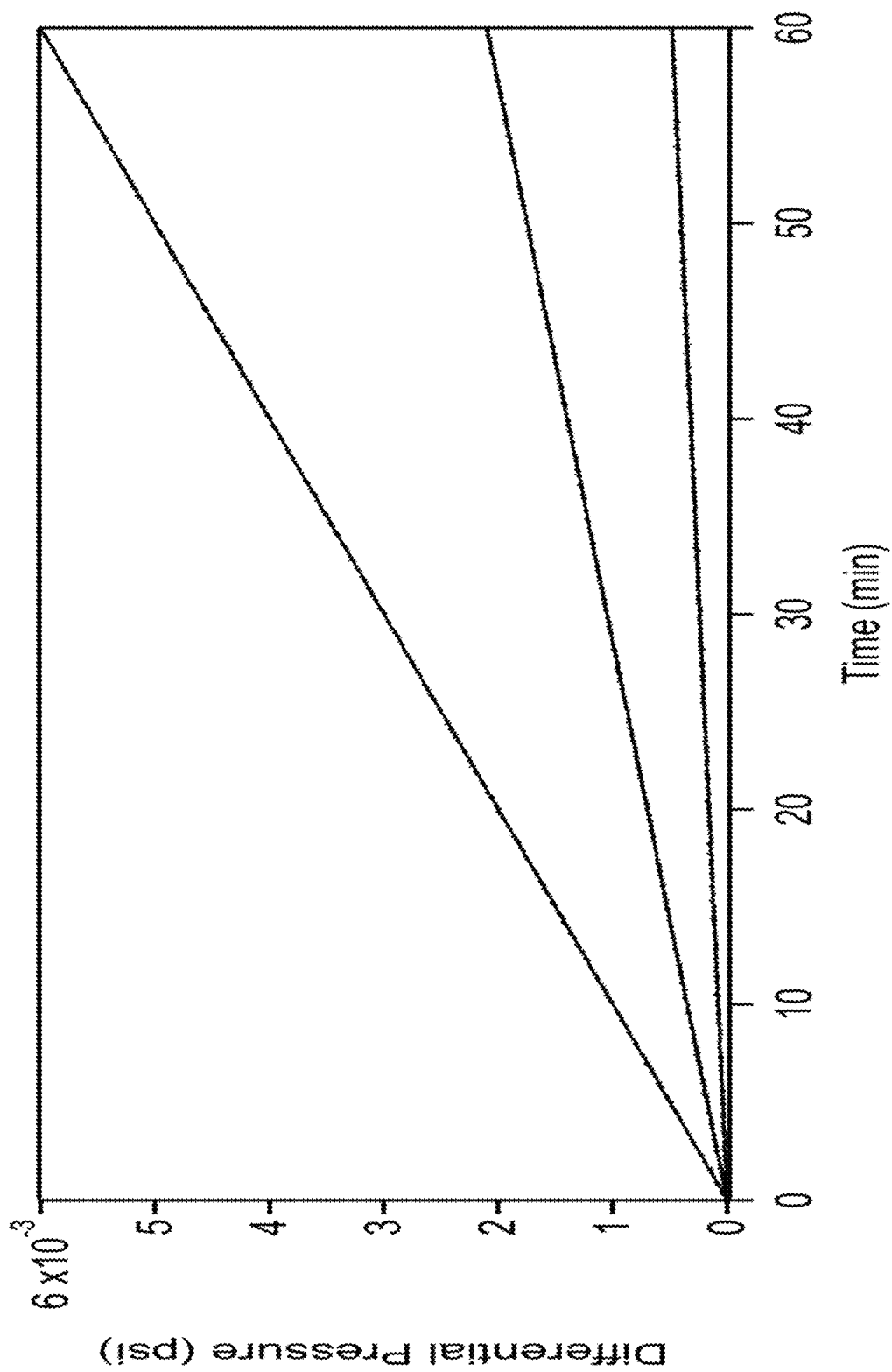
FIG. 4C depicts a graph in accordance with an embodiment.

In an embodiment, the at least one instrument includes a viscometer (VIS) (e.g., a capillary bridge viscometer), where the received data indicates time-varying differential pressure values, where the differential pressure values are derived from at least one measurement of the at least one sample by the viscometer. In a specific embodiment, the at least one instrument is a viscometer, where the received data indicates time-varying differential pressure values, where the differential pressure values are derived from at least one measurement of the at least one sample by the viscometer. In a specific example, FIG. 4A, FIG. 4B, and FIG. 4C could depict time-varying differential pressure values derived from at least one measurement of the at least one sample by the viscometer.

In an embodiment, the at least one instrument includes an ultraviolet-visible absorption (UV) detector, where the received data indicates ratios of the intensity of light passing through the at least one sample to the intensity of light before it passes through the at least one sample, where the ratios are derived from at least one measurement of the at least one sample by the UV detector. In a specific embodiment, the at least one instrument is an ultraviolet-visible absorption (UV) detector, where the received data indicates ratios of the intensity of light passing through the at least one sample to the intensity of light before it passes through the at least one sample, where the ratios are derived from at least one measurement of the at least one sample by the UV detector.

Characteristics

In an embodiment, one of the at least two characteristics represents a phenomenon selected from the group consisting of noise, wander, and drift, where the data segments include 0-second to 30-second data segments in response to the phenomenon being noise, 30-second to 5-minute data segments in response to the phenomenon being wander, and 5-minute to n-minute data segments in response to the phenomenon being drift, where n is a number less than or equal to 10. In an alternative embodiment, the at least one characteristic represents a phenomenon selected from the group consisting of noise, wander, and drift, where the data segments include 0-second to 30-second data segments in response to the phenomenon being noise (i.e., short term noise), 30-second to 5-minute data segments in response to the phenomenon being wander (i.e., long term noise), and 5-minute to n-minute data segments in response to the phenomenon being drift, where n is a number less than or equal to 10. For example, FIG. 2A, FIG. 3A, and FIG. 4A could depict noise phenomena. In another example, FIG. 2B, FIG. 3B, and FIG. 4B could depict wander phenomena. Also, for example, FIG. 2C, FIG. 3C, and FIG. 4C could depict drift phenomena. In a further embodiment, one of the at least two characteristics represents a possible flow cell obstruction or sample absorption, as indicated by a forward monitor (FMON) indicator/light on the at least one instrument.

Analyzing Data Segments

In an exemplary embodiment, the analyzing includes at least one of (a) comparing, by the computer system, the data segments to at least one of noise amplitude values and noise slope values, resulting in the analyzed data segments indicating noise, (b) comparing, by the computer system, the data segments to at least one of wander amplitude values and wander slope values, resulting in the analyzed data segments indicating wander, and (c) comparing, by the computer system, the data segments to at least one of drift slope values and drift amplitude values, resulting in the analyzed data segments indicating drift. In an exemplary embodiment, analyzing operation 114 includes at least one of (a) an operation of comparing, by the computer system, the data segments to at least one of noise amplitude values and noise slope values, resulting in the analyzed data segments indicating noise, (b) an operation of comparing, by the computer system, the data segments to at least one of wander amplitude values and wander slope values, resulting in the analyzed data segments indicating wander, and (c) an operation of comparing, by the computer system, the data segments to at least one of drift slope values and drift amplitude values, resulting in the analyzed data segments indicating drift. In an embodiment, analyzer 136 is configured to perform at least one of the following: (a) comparing data segments 160 to at least one of noise amplitude values and noise slope values, resulting in analyzed data segments 162 indicating noise (i.e., noise data segments), (b) comparing data segments 160 to at least one of wander amplitude values and wander slope values, resulting in analyzed data segments 162 indicating wander (i.e., wander data segments), and (c) comparing data segments 160 to at least one of drift slope values and drift amplitude values, resulting in analyzed data segments 162 indicating drift (i.e., drift data segments).

In an embodiment, analyzer 136 includes a computer system, such as computer system 1000 as shown in FIG. 10, performing at least one of the following: (a) comparing data segments 160 to at least one of noise amplitude values and noise slope values, resulting in analyzed data segments 162 indicating noise, (b) comparing data segments 160 to at least one of wander amplitude values and wander slope values, resulting in analyzed data segments 162 indicating wander, and (c) comparing data segments 160 to at least one of drift slope values and drift amplitude values, resulting in analyzed data segments 162 indicating drift. In an embodiment, analyzer 136 includes a computer system, such as computer system/server 1012 as shown in FIG. 10, performing at least one of the following: (a) comparing data segments 160 to at least one of noise amplitude values and noise slope values, resulting in analyzed data segments 162 indicating noise, (b) comparing data segments 160 to at least one of wander amplitude values and wander slope values, resulting in analyzed data segments 162 indicating wander, and (c) comparing data segments 160 to at least one of drift slope values and drift amplitude values, resulting in analyzed data segments 162 indicating drift. In an embodiment, analyzer 136 includes a computer system, such as processing unit 1016 as shown in FIG. 10, performing at least one of the following: (a) comparing data segments 160 to at least one of noise amplitude values and noise slope values, resulting in analyzed data segments 162 indicating noise, (b) comparing data segments 160 to at least one of wander amplitude values and wander slope values, resulting in analyzed data segments 162 indicating wander, and (c) comparing data segments 160 to at least one of drift slope values and drift amplitude values, resulting in analyzed data segments 162 indicating drift. In an embodiment, analyzer 136 is a processor of at least one analytical instrument 190, performing at least one of the following: (a) comparing data segments 160 to at least one of noise amplitude values and noise slope values, resulting in analyzed data segments 162 indicating noise, (b) comparing data segments 160 to at least one of wander amplitude values and wander slope values, resulting in analyzed data segments 162 indicating wander, and (c) comparing data segments 160 to at least one of drift slope values and drift amplitude values, resulting in analyzed data segments 162 indicating drift.

In an embodiment, analyzer 136 is implemented as computer software executing on a computer system, such as computer system 1000 as shown in FIG. 10, such that the computer system performs at least one of the following: (a) comparing data segments 160 to at least one of noise amplitude values and noise slope values, resulting in analyzed data segments 162 indicating noise, (b) comparing data segments 160 to at least one of wander amplitude values and wander slope values, resulting in analyzed data segments 162 indicating wander, and (c) comparing data segments 160 to at least one of drift slope values and drift amplitude values, resulting in analyzed data segments 162 indicating drift. In an embodiment, analyzer 136 is implemented as computer software executing on a computer system, such as computer system/server 1012 as shown in FIG. 10, such that the computer system performs at least one of the following: (a) comparing data segments 160 to at least one of noise amplitude values and noise slope values, resulting in analyzed data segments 162 indicating noise, (b) comparing data segments 160 to at least one of wander amplitude values and wander slope values, resulting in analyzed data segments 162 indicating wander, and (c) comparing data segments 160 to at least one of drift slope values and drift amplitude values, resulting in analyzed data segments 162 indicating drift. In an embodiment, analyzer 136 is implemented as computer software executing on a computer system, such as processing unit 1016 as shown in FIG. 10, such that the computer system performs at least one of the following: (a) comparing data segments 160 to at least one of noise amplitude values and noise slope values, resulting in analyzed data segments 162 indicating noise, (b) comparing data segments 160 to at least one of wander amplitude values and wander slope values, resulting in analyzed data segments 162 indicating wander, and (c) comparing data segments 160 to at least one of drift slope values and drift amplitude values, resulting in analyzed data segments 162 indicating drift. In an embodiment, analyzer 136 is implemented as computer software executing on a computer system, such as a processor of at least one analytical instrument 190, such that the computer system performs at least one of the following: (a) comparing data segments 160 to at least one of noise amplitude values and noise slope values, resulting in analyzed data segments 162 indicating noise, (b) comparing data segments 160 to at least one of wander amplitude values and wander slope values, resulting in analyzed data segments 162 indicating wander, and (c) comparing data segments 160 to at least one of drift slope values and drift amplitude values, resulting in analyzed data segments 162 indicating drift.

In an embodiment, analyzer 136 performs at least one of the following as computer software executing on a processor/processing unit of analyzer 136: (a) comparing data segments 160 to at least one of noise amplitude values and noise slope values, resulting in analyzed data segments 162 indicating noise, (b) comparing data segments 160 to at least one of wander amplitude values and wander slope values, resulting in analyzed data segments 162 indicating wander, and (c) comparing data segments 160 to at least one of drift slope values and drift amplitude values, resulting in analyzed data segments 162 indicating drift. In an embodiment, analyzer 136 performs at least one of the following as computer software executing on a processor of at least one analytical instrument 190: (a) comparing data segments 160 to at least one of noise amplitude values and noise slope values, resulting in analyzed data segments 162 indicating noise, (b) comparing data segments 160 to at least one of wander amplitude values and wander slope values, resulting in analyzed data segments 162 indicating wander, and (c) comparing data segments 160 to at least one of drift slope values and drift amplitude values, resulting in analyzed data segments 162 indicating drift. In an embodiment, analyzer 136 is a machine learning computer software/program/algorithm performing at least one of the following: (a) comparing data segments 160 to at least one of noise amplitude values and noise slope values, resulting in analyzed data segments 162 indicating noise, (b) comparing data segments 160 to at least one of wander amplitude values and wander slope values, resulting in analyzed data segments 162 indicating wander, and (c) comparing data segments 160 to at least one of drift slope values and drift amplitude values, resulting in analyzed data segments 162 indicating drift.

Displaying Status

Figure 5A:
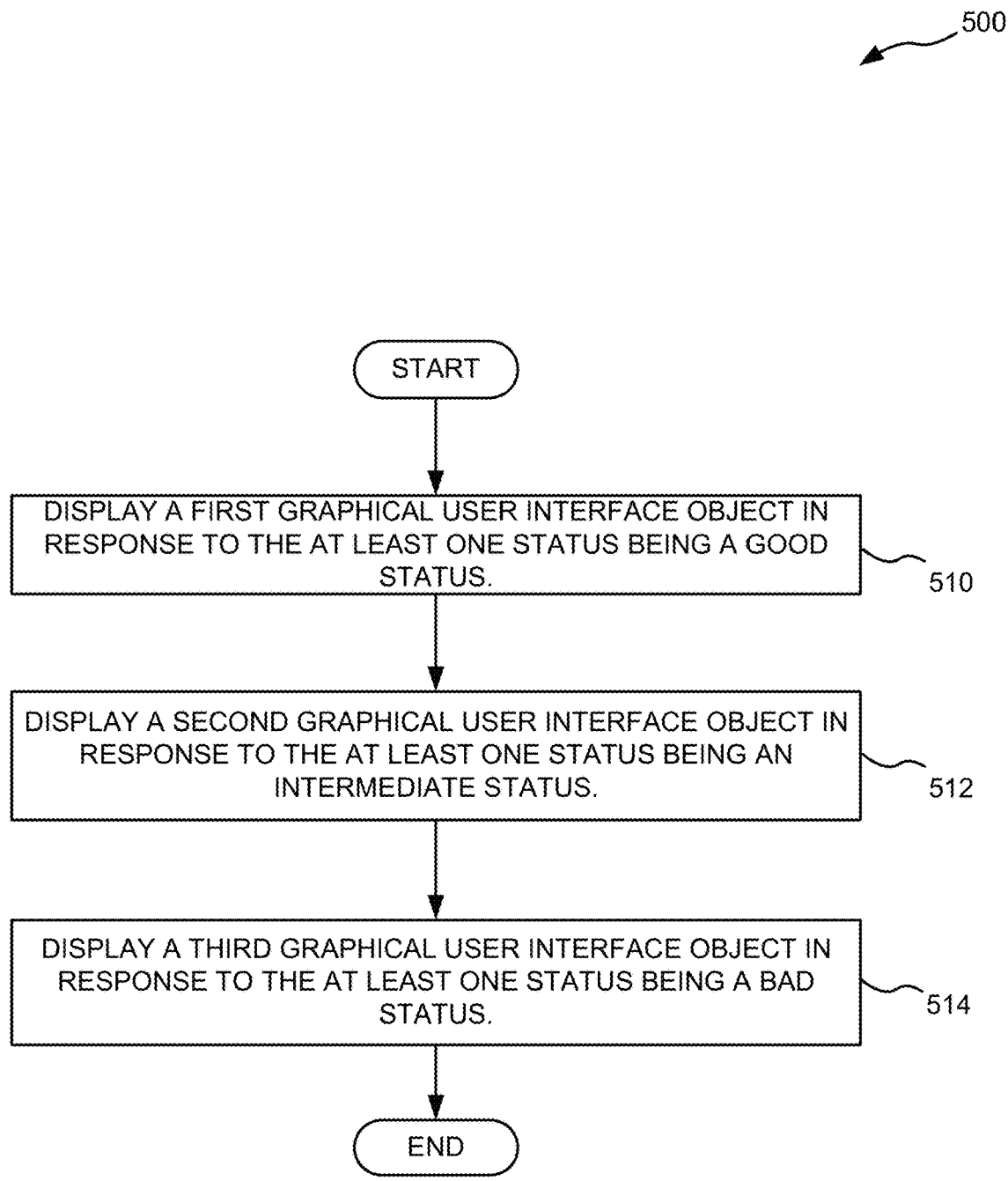
FIG. 5A depicts a flowchart in accordance with an embodiment.

In an exemplary embodiment, the displaying includes (a) displaying a first graphical user interface object in response to the at least one status being a good status, (b) displaying a second graphical user interface object in response to the at least one status being an intermediate status, and (c) displaying a third graphical user interface object in response to the at least one status being a bad status. Referring to FIG. 5A, in an exemplary embodiment, displaying operation 120 includes an operation 510 of displaying a first graphical user interface object in response to the at least one status being a good status, an operation 512 of displaying a second graphical user interface object in response to the at least one status being an intermediate status, and an operation 514 of displaying a third graphical user interface object in response to the at least one status being a bad status. In a particular embodiment, the first graphical user interface object includes a green-colored graphical user interface object. For example, the first graphical user interface object could be a green-colored graphical user interface object, such as a green-colored circle. In a particular embodiment, the second graphical user interface object includes a yellow-colored graphical user interface object. For example, the second graphical user interface object could be a yellow-colored graphical user interface object, such as a yellow-colored circle. In a particular embodiment, the third graphical user interface object includes a red-colored graphical user interface object. For example, the third graphical user interface object could be a red-colored graphical user interface object, such as a red-colored circle.

In an embodiment, displayer 146 includes a computer system 1000 as shown in FIG. 10, that executes an indicating a status of an analytical instrument on a screen of the analytical instrument script or computer software application that carries out the operations of at least method 500. In an embodiment, displayer 146 includes a computer system/server 1012 as shown in FIG. 10, that executes an indicating a status of an analytical instrument on a screen of the analytical instrument script or computer software application that carries out the operations of at least method 500. In an embodiment, displayer 146 includes a processing unit 1016 as shown in FIG. 10, that executes an indicating a status of an analytical instrument on a screen of the analytical instrument script or computer software application that carries out the operations of at least method 500. In an embodiment, displayer 146 is a processor of the at least one analytical instrument, that executes an indicating a status of an analytical instrument on a screen of the analytical instrument script or computer software application that carries out the operations of at least method 500. In an embodiment, displayer 146 is a machine learning computer software/program/algorithm that executes an indicating a status of an analytical instrument on a screen of the analytical instrument script or computer software application that carries out the operations of at least method 500.

In an embodiment, displayer 146 includes a computer system 1000 as shown in FIG. 10, that executes an indicating a status of an analytical instrument on a screen of the analytical instrument script or computer software application that carries out at least operations 510, 512, and 514. In an embodiment, displayer 146 includes a computer system/server 1012 as shown in FIG. 10, that executes an indicating a status of an analytical instrument on a screen of the analytical instrument script or computer software application that carries out at least operations 510, 512, and 514. In an embodiment, displayer 146 includes a processing unit 1016 as shown in FIG. 10, that executes an indicating a status of an analytical instrument on a screen of the analytical instrument script or computer software application that carries out at least operations 510, 512, and 514. In an embodiment, displayer 146 is a processor of the at least one analytical instrument, that executes an indicating a status of an analytical instrument on a screen of the analytical instrument script or computer software application that carries out at least operations 510, 512, and 514. In an embodiment, displayer 146 is a machine learning computer software/program/algorithm that executes an indicating a status of an analytical instrument on a screen of the analytical instrument script or computer software application that carries out at least operations 510, 512, and 514.

In an embodiment, displayer 146 is configured to display a first graphical user interface object in response to at least one status 164 being a good status. In an embodiment, displayer 146 includes a computer system, such as computer system 1000 as shown in FIG. 10, performing operation 510. In an embodiment, displayer 146 includes a computer system, such as computer system/server 1012 as shown in FIG. 10, performing operation 510. In an embodiment, displayer 146 includes a computer system, such as processing unit 1016 as shown in FIG. 10, performing operation 510. In an embodiment, displayer 146 is a processor of the at least one analytical instrument performing operation 510. In an embodiment, displayer 146 is implemented as computer software executing on a computer system, such as computer system 1000 as shown in FIG. 10, such that the computer system performs operation 510. In an embodiment, displayer 146 is implemented as computer software executing on a computer system, such as computer system/server 1012 as shown in FIG. 10, such that the computer system performs operation 510. In an embodiment, displayer 146 is implemented as computer software executing on a computer system, such as processing unit 1016 as shown in FIG. 10, such that the computer system performs operation 510. In an embodiment, displayer 146 is implemented as computer software executing on a computer system, such as a processor of the at least one analytical instrument, such that the computer system performs operation 510. In an embodiment, displayer 146 performs operation 510 as computer software executing on a processor of displayer 146. In an embodiment, displayer 146 performs operation 510 as computer software executing on a processor of at least one analytical instrument 190. In an embodiment, displayer 146 includes a computer system, such as a machine learning computer software/program/algorithm performing operation 510.

In an embodiment, displayer 146 is configured to display a second graphical user interface object in response to at least one status 164 being an intermediate status. In an embodiment, displayer 146 includes a computer system, such as computer system 1000 as shown in FIG. 10, performing operation 512. In an embodiment, displayer 146 includes a computer system, such as computer system/server 1012 as shown in FIG. 10, performing operation 512. In an embodiment, displayer 146 includes a computer system, such as processing unit 1016 as shown in FIG. 10, performing operation 512. In an embodiment, displayer 146 is a processor of the at least one analytical instrument performing operation 512. In an embodiment, displayer 146 is implemented as computer software executing on a computer system, such as computer system 1000 as shown in FIG. 10, such that the computer system performs operation 512. In an embodiment, displayer 146 is implemented as computer software executing on a computer system, such as computer system/server 1012 as shown in FIG. 10, such that the computer system performs operation 512. In an embodiment, displayer 146 is implemented as computer software executing on a computer system, such as processing unit 1016 as shown in FIG. 10, such that the computer system performs operation 512. In an embodiment, displayer 146 is implemented as computer software executing on a computer system, such as a processor of the at least one analytical instrument, such that the computer system performs operation 512. In an embodiment, displayer 146 performs operation 512 as computer software executing on a processor of displayer 146. In an embodiment, displayer 146 performs operation 512 as computer software executing on a processor of at least one analytical instrument 190. In an embodiment, displayer 146 includes a computer system, such as a machine learning computer software/program/algorithm performing operation 512.

In an embodiment, displayer 146 is configured to display a third graphical user interface object in response to at least one status 164 being a bad status. In an embodiment, displayer 146 includes a computer system, such as computer system 1000 as shown in FIG. 10, performing operation 514. In an embodiment, displayer 146 includes a computer system, such as computer system/server 1012 as shown in FIG. 10, performing operation 514. In an embodiment, displayer 146 includes a computer system, such as processing unit 1016 as shown in FIG. 10, performing operation 514. In an embodiment, displayer 146 is a processor of the at least one analytical instrument performing operation 514. In an embodiment, displayer 146 is implemented as computer software executing on a computer system, such as computer system 1000 as shown in FIG. 10, such that the computer system performs operation 514. In an embodiment, displayer 146 is implemented as computer software executing on a computer system, such as computer system/server 1012 as shown in FIG. 10, such that the computer system performs operation 514. In an embodiment, displayer 146 is implemented as computer software executing on a computer system, such as processing unit 1016 as shown in FIG. 10, such that the computer system performs operation 514. In an embodiment, displayer 146 is implemented as computer software executing on a computer system, such as a processor of the at least one analytical instrument, such that the computer system performs operation 514. In an embodiment, displayer 146 performs operation 514 as computer software executing on a processor of displayer 146. In an embodiment, displayer 146 performs operation 514 as computer software executing on a processor of at least one analytical instrument 190. In an embodiment, displayer 146 includes a computer system, such as a machine learning computer software/program/algorithm performing operation 514.

Visual Rendering

Figure 5B:
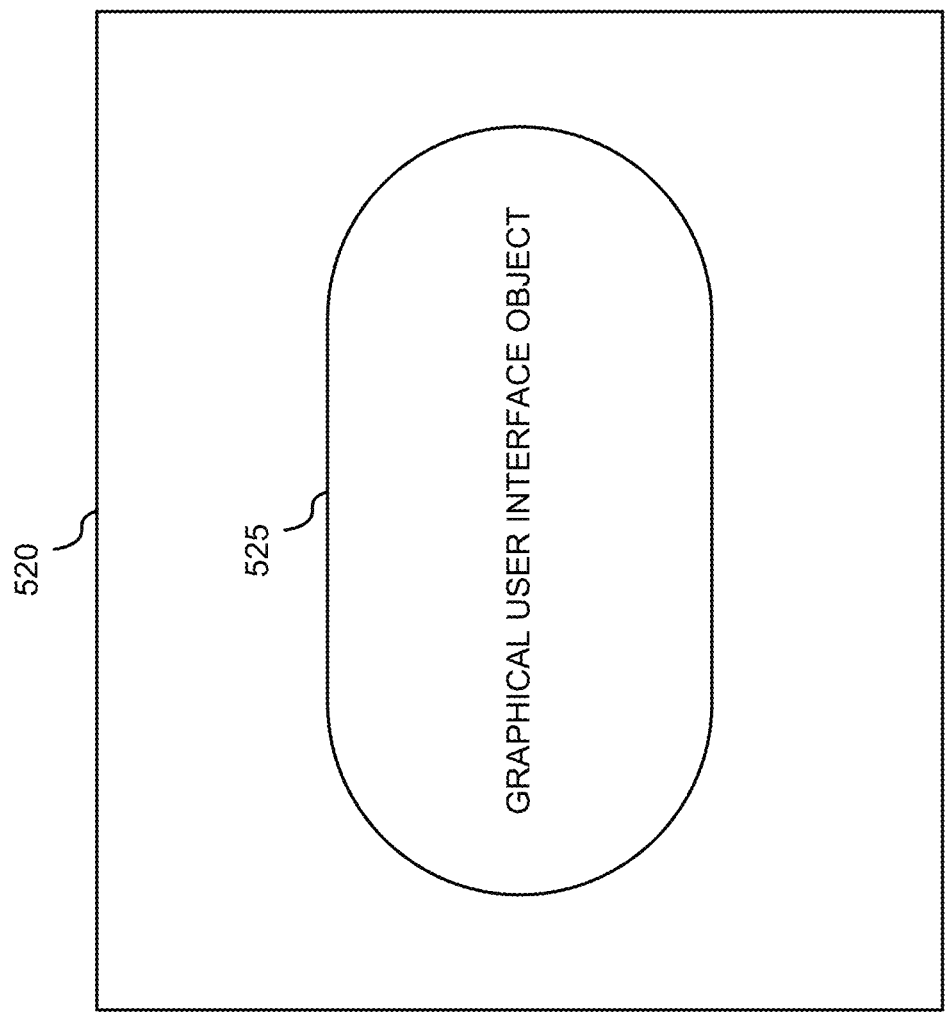
FIG. 5B depicts a graphical display in accordance with an embodiment.

In an embodiment, the displaying includes displaying the first graphical user interface object as a graphical user interface object in a region of the at least one display of the at least one instrument in response to the at least one status being a good status. Referring to FIG. 5B, in an embodiment, displaying operation 510 includes displaying the first graphical user interface object (e.g., a green-colored graphical user interface object) as a graphical user interface object 525 in a region 520 of the at least one display of at least one instrument 190 in response to at least one status 164 being a good status. In an embodiment, the displaying includes displaying the second graphical user interface object as a graphical user interface object in a region of the at least one display of the at least one instrument in response to the at least one status being an intermediate status. Referring to FIG. 5B, in an embodiment, displaying operation 512 includes displaying the second graphical user interface object (e.g., a yellow-colored graphical user interface object) as graphical user interface object 525 in region 520 of the at least one display of at least one instrument 190 in response to at least one status 164 being an intermediate status. In an embodiment, the displaying includes displaying the third graphical user interface object as a graphical user interface object in a region of the at least one display of the at least one instrument in response to the at least one status being a bad status. Referring to FIG. 5B, in an embodiment, displaying operation 514 includes displaying the third graphical user interface object (e.g., a red-colored graphical user interface object) as graphical user interface object 525 in region 520 of the at least one display of at least one instrument 190 in response to at least one status 164 being a bad status.

Figure 5C:
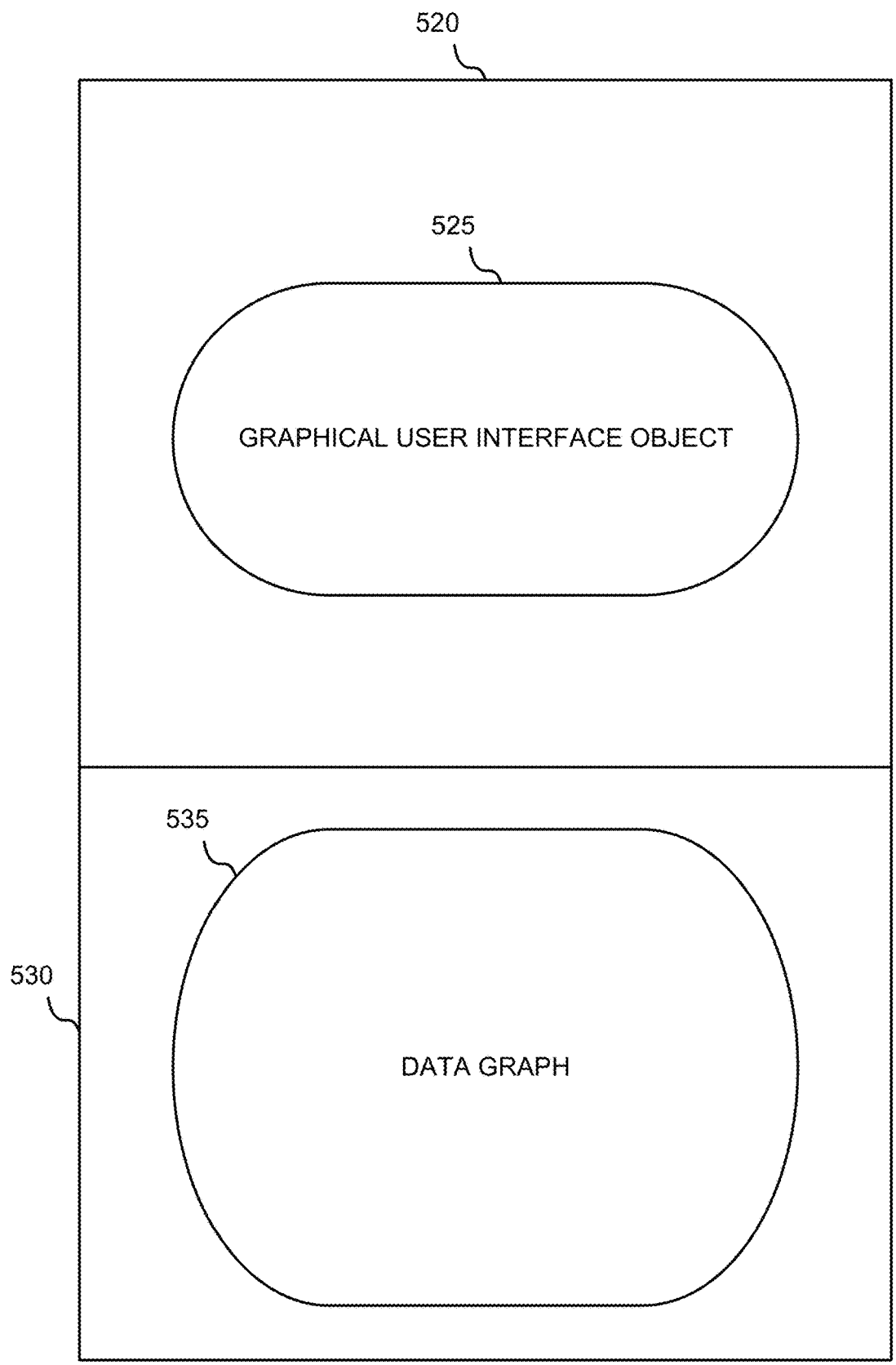
FIG. 5C depicts a graphical display in accordance with an embodiment.
Figure 5D:
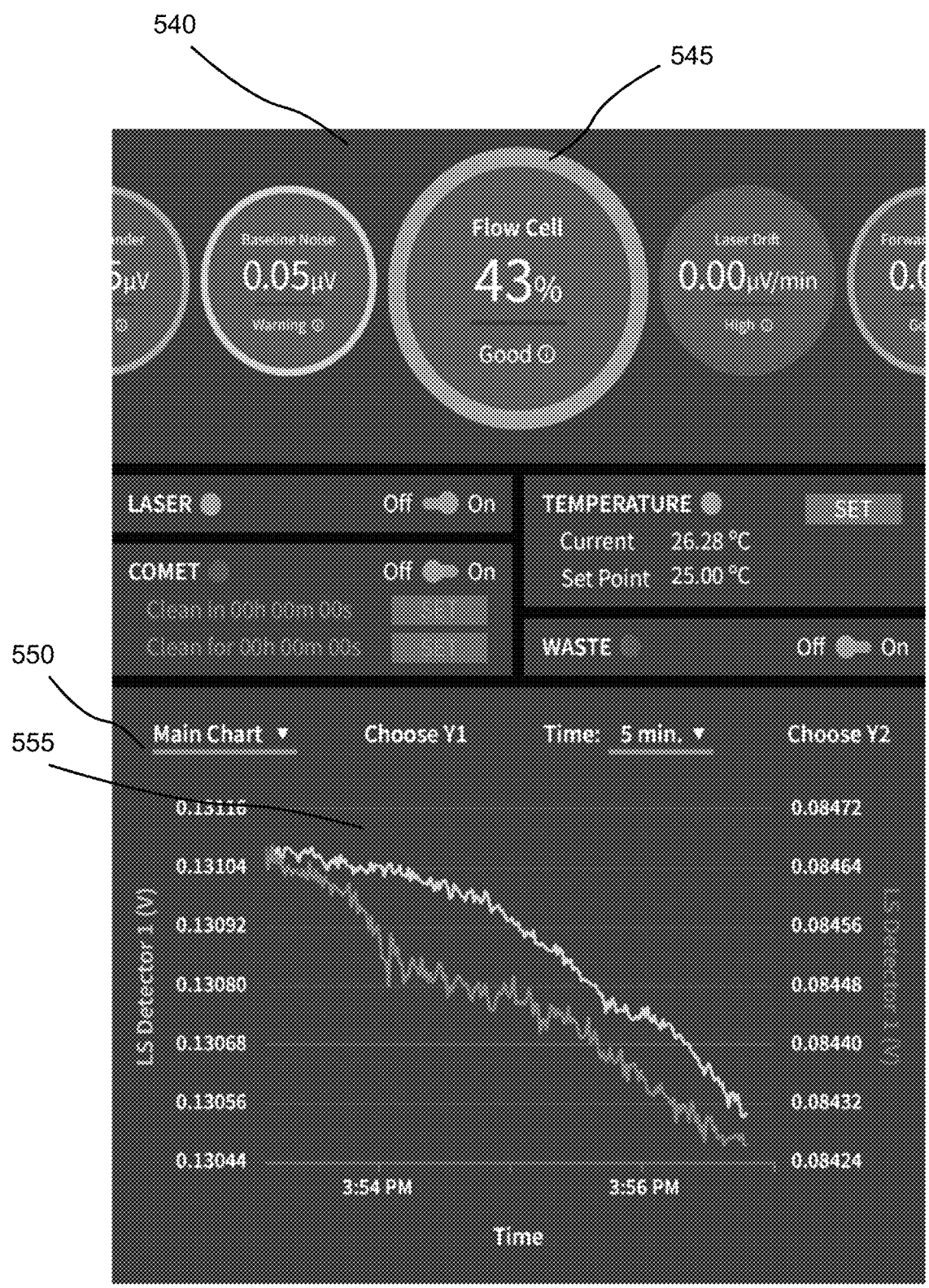
FIG. 5D depicts a graphical display in accordance with an embodiment.

In a further embodiment, the displaying further includes displaying a data graph corresponding to the at least one status in another region of the at least one display of the at least one instrument. Referring to FIG. 5C, in a further embodiment, displaying operation 510 further includes displaying a data graph 535 corresponding to at least one status 164 in another region 530 of the at least one display of at least one instrument 190. For example, displayer 146 could display graphical user interface objects as depicted in FIG. 5D. Specifically, for example, displayer 146 could display a graphical user interface object 545 (e.g., graphical user interface object 525) in a region 540 (e.g., region 520) corresponding to at least one status 164 and could display a data graph 555 (e.g., data graph 535) corresponding to at least one status 164 in another region 550 (e.g., another region 530) of the at least one display of at least one instrument 190.

Changing State of Instrument

In a further embodiment, the computer implemented method, the system, and the computer program product further include executing, by the computer system, a set of logical operations changing at least one state of the at least one instrument with respect to the at least one status. In a further embodiment, the computer implemented method, the system, and the computer program product are configured to perform a further operation of executing, by the computer system, a set of logical operations changing at least one state of the at least one instrument with respect to the at least one status. In an embodiment, the computer system is configured to execute a set of logical operations changing at least one state of at least one instrument 190 with respect to at least one status 164.

In an embodiment, the computer system includes a computer system, such as computer system 1000 as shown in FIG. 10, executing a set of logical operations changing at least one state of at least one instrument 190 with respect to at least one status 164. In an embodiment, the computer system includes a computer system, such as computer system/server 1012 as shown in FIG. 10, executing a set of logical operations changing at least one state of at least one instrument 190 with respect to at least one status 164. In an embodiment, the computer system includes a computer system, such as processing unit 1016 as shown in FIG. 10, executing a set of logical operations changing at least one state of at least one instrument 190 with respect to at least one status 164. In an embodiment, the computer system is a processor of at least one analytical instrument 190, executing a set of logical operations changing at least one state of at least one instrument 190 with respect to at least one status 164.

In an embodiment, the computer system is implemented as computer software executing on a computer system, such as computer system 1000 as shown in FIG. 10, such that the computer system executes a set of logical operations changing at least one state of at least one instrument 190 with respect to at least one status 164. In an embodiment, the computer system is implemented as computer software executing on a computer system, such as computer system/server 1012 as shown in FIG. 10, such that the computer system executes a set of logical operations changing at least one state of at least one instrument 190 with respect to at least one status 164. In an embodiment, the computer system is implemented as computer software executing on a computer system, such as processing unit 1016 as shown in FIG. 10, such that the computer system executes a set of logical operations changing at least one state of at least one instrument 190 with respect to at least one status 164. In an embodiment, the computer system is implemented as computer software executing on a computer system, such as a processor of at least one analytical instrument 190, such that the computer system executes a set of logical operations changing at least one state of at least one instrument 190 with respect to at least one status 164.

In an embodiment, the computer system executes a set of logical operations changing at least one state of at least one instrument 190 with respect to at least one status 164, as computer software executing on a processor of the computer system. In an embodiment, the computer system executes a set of logical operations changing at least one state of at least one instrument 190 with respect to at least one status 164, as computer software executing on a processor of at least one analytical instrument 190. In an embodiment, the computer system is a machine learning computer software/program/algorithm executing a set of logical operations changing at least one state of at least one instrument 190 with respect to at least one status 164.

For example, changing the state of instrument 190 could include starting software and front panel data collection of instrument 190, where instrument 190 could be a MALS, a viscometer, a differential refractometer, a fast protein liquid chromatography (FPLC) system, a high-performance liquid chromatography (HPLC) system, and an ultra-performance liquid chromatography (UPLC) system. In another example, changing the state of instrument 190 could include recycling solvents. Also, changing the state of instrument 190 could include toggling a relay switch on/off to start/stop controllers, such as robotic autosamplers for loading and injecting samples, pump controls, temperature controllers of column ovens, switches for UV lamps, controllers for balancing UV, controllers for sample fraction collectors (collecting or dispensing), and controllers for switching fluid lines.

Changing State with Respect to Characteristics

Changing State with Respect to Noise and Wander

In an embodiment, the changing includes activating a cleaning system to clean the at least one instrument in response to the at least one status being at least one of an intermediate status and a bad status, where the at least two characteristics represent noise and wander. In an embodiment, the changing operation includes an operation of activating a cleaning system to clean the at least one instrument in response to the at least one status being at least one of an intermediate status and a bad status, where the at least two characteristics represent noise and wander. In an embodiment, the computer system is configured to activate a cleaning system to clean at least one instrument 190 in response to at least one status 164 being at least one of an intermediate status and a bad status, where at least two characteristics 152, 154 represent noise and wander. In a particular embodiment, the cleaning system includes a transducer. In a specific embodiment, the cleaning system includes an ultrasonic transducer.

In an embodiment, the computer system includes a computer system, such as computer system 1000 as shown in FIG. 10, activating a cleaning system to clean at least one instrument 190 in response to at least one status 164 being at least one of an intermediate status and a bad status, where at least two characteristics 152, 154 represent noise and wander. In an embodiment, the computer system includes a computer system, such as computer system/server 1012 as shown in FIG. 10, activating a cleaning system to clean at least one instrument 190 in response to at least one status 164 being at least one of an intermediate status and a bad status, where at least two characteristics 152, 154 represent noise and wander. In an embodiment, the computer system includes a computer system, such as processing unit 1016 as shown in FIG. 10, activating a cleaning system to clean at least one instrument 190 in response to at least one status 164 being at least one of an intermediate status and a bad status, where at least two characteristics 152, 154 represent noise and wander. In an embodiment, the computer system is a processor of at least one analytical instrument 190, activating a cleaning system to clean at least one instrument 190 in response to at least one status 164 being at least one of an intermediate status and a bad status, where at least two characteristics 152, 154 represent noise and wander.

In an embodiment, the computer system is implemented as computer software executing on a computer system, such as computer system 1000 as shown in FIG. 10, such that the computer system activates a cleaning system to clean at least one instrument 190 in response to at least one status 164 being at least one of an intermediate status and a bad status, where at least two characteristics 152, 154 represent noise and wander. In an embodiment, the computer system is implemented as computer software executing on a computer system, such as computer system/server 1012 as shown in FIG. 10, such that the computer system activates a cleaning system to clean at least one instrument 190 in response to at least one status 164 being at least one of an intermediate status and a bad status, where at least two characteristics 152, 154 represent noise and wander. In an embodiment, the computer system is implemented as computer software executing on a computer system, such as processing unit 1016 as shown in FIG. 10, such that the computer system activates a cleaning system to clean at least one instrument 190 in response to at least one status 164 being at least one of an intermediate status and a bad status, where at least two characteristics 152, 154 represent noise and wander. In an embodiment, the computer system is implemented as computer software executing on a computer system, such as a processor of at least one analytical instrument 190, such that the computer system activates a cleaning system to clean at least one instrument 190 in response to at least one status 164 being at least one of an intermediate status and a bad status, where at least two characteristics 152, 154 represent noise and wander.

In an embodiment, the computer system activates a cleaning system to clean at least one instrument 190 in response to at least one status 164 being at least one of an intermediate status and a bad status, where at least two characteristics 152, 154 represent noise and wander, as computer software executing on a processor of the computer system. In an embodiment, the computer system activates a cleaning system to clean at least one instrument 190 in response to at least one status 164 being at least one of an intermediate status and a bad status, where at least two characteristics 152, 154 represent noise and wander, as computer software executing on a processor of at least one analytical instrument 190. In an embodiment, the computer system is a machine learning computer software/program/algorithm activating a cleaning system to clean at least one instrument 190 in response to at least one status 164 being at least one of an intermediate status and a bad status, where at least two characteristics 152, 154 represent noise and wander.

Changing State with Respect to Drift

In an embodiment, the changing includes activating a purging system to purge the at least one sample from the at least one instrument in response to the at least one status being at least one of an intermediate status and a bad status, where one of the at least two characteristics represents drift. In an embodiment, the changing operation includes an operation of activating a purging system to purge the at least one sample from the at least one instrument in response to the at least one status being at least one of an intermediate status and a bad status, where one of the at least two characteristics represents drift. In an embodiment, the computer system is configured to activate a purging system to purge at least one sample 193 from at least one instrument 190 in response to at least one status 164 being at least one of an intermediate status and a bad status, where one of at least two characteristics 152, 154 represents drift.

In an embodiment, the computer system includes a computer system, such as computer system 1000 as shown in FIG. 10, activating a purging system to purge at least one sample 193 from at least one instrument 190 in response to at least one status 164 being at least one of an intermediate status and a bad status, where one of at least two characteristics 152, 154 represents drift. In an embodiment, the computer system includes a computer system, such as computer system/server 1012 as shown in FIG. 10, activating a purging system to purge at least one sample 193 from at least one instrument 190 in response to at least one status 164 being at least one of an intermediate status and a bad status, where one of at least two characteristics 152, 154 represents drift. In an embodiment, the computer system includes a computer system, such as processing unit 1016 as shown in FIG. 10, activating a purging system to purge at least one sample 193 from at least one instrument 190 in response to at least one status 164 being at least one of an intermediate status and a bad status, where one of at least two characteristics 152, 154 represents drift. In an embodiment, the computer system is a processor of at least one analytical instrument 190, activating a purging system to purge at least one sample 193 from at least one instrument 190 in response to at least one status 164 being at least one of an intermediate status and a bad status, where one of at least two characteristics 152, 154 represents drift.

In an embodiment, the computer system is implemented as computer software executing on a computer system, such as computer system 1000 as shown in FIG. 10, such that the computer system activates a purging system to purge at least one sample 193 from at least one instrument 190 in response to at least one status 164 being at least one of an intermediate status and a bad status, where one of at least two characteristics 152, 154 represents drift. In an embodiment, the computer system is implemented as computer software executing on a computer system, such as computer system/server 1012 as shown in FIG. 10, such that the computer system activates a purging system to purge at least one sample 193 from at least one instrument 190 in response to at least one status 164 being at least one of an intermediate status and a bad status, where one of at least two characteristics 152, 154 represents drift. In an embodiment, the computer system is implemented as computer software executing on a computer system, such as processing unit 1016 as shown in FIG. 10, such that the computer system activates a purging system to purge at least one sample 193 from at least one instrument 190 in response to at least one status 164 being at least one of an intermediate status and a bad status, where one of at least two characteristics 152, 154 represents drift. In an embodiment, the computer system is implemented as computer software executing on a computer system, such as a processor of at least one analytical instrument 190, such that the computer system activates a purging system to purge at least one sample 193 from at least one instrument 190 in response to at least one status 164 being at least one of an intermediate status and a bad status, where one of at least two characteristics 152, 154 represents drift.

In an embodiment, the computer system activates a purging system to purge at least one sample 193 from at least one instrument 190 in response to at least one status 164 being at least one of an intermediate status and a bad status, where one of at least two characteristics 152, 154 represents drift, as computer software executing on a processor of the computer system. In an embodiment, the computer system activates a purging system to purge at least one sample 193 from at least one instrument 190 in response to at least one status 164 being at least one of an intermediate status and a bad status, where one of at least two characteristics 152, 154 represents drift, as computer software executing on a processor of at least one analytical instrument 190. In an embodiment, the computer system is a machine learning computer software/program/algorithm activating a purging system to purge at least one sample 193 from at least one instrument 190 in response to at least one status 164 being at least one of an intermediate status and a bad status, where one of at least two characteristics 152, 154 represents drift.

Changing State with Respect to Forward Monitor

In an embodiment, the changing includes activating a purging system to purge the at least one sample from the at least one instrument in response to the at least one status being a bad status, where one of the at least two characteristics represents a signal from a forward monitor sensor. In an embodiment, the changing operation includes an operation of activating a purging system to purge the at least one sample from the at least one instrument in response to the at least one status being a bad status, where one of the at least two characteristics represents forward monitor. In an embodiment, the computer system is configured to activate a purging system to purge at least one sample 193 from at least one instrument 190 in response to at least one status 164 being a bad status, where one of at least two characteristics 152, 154 represents forward monitor. In a particular embodiment, at least one instrument 190 includes a multi-angle light scattering instrument. In a particular embodiment, at least one instrument 190 includes a viscometer.

In an embodiment, the computer system includes a computer system, such as computer system 1000 as shown in FIG. 10, activating a purging system to purge at least one sample 193 from at least one instrument 190 in response to at least one status 164 being a bad status, where one of at least two characteristics 152, 154 represents forward monitor. In an embodiment, the computer system includes a computer system, such as computer system/server 1012 as shown in FIG. 10, activating a purging system to purge at least one sample 193 from at least one instrument 190 in response to at least one status 164 being a bad status, where one of at least two characteristics 152, 154 represents forward monitor. In an embodiment, the computer system includes a computer system, such as processing unit 1016 as shown in FIG. 10, activating a purging system to purge at least one sample 193 from at least one instrument 190 in response to at least one status 164 being a bad status, where one of at least two characteristics 152, 154 represents forward monitor. In an embodiment, the computer system is a processor of at least one analytical instrument 190, activating a purging system to purge at least one sample 193 from at least one instrument 190 in response to at least one status 164 being a bad status, where one of at least two characteristics 152, 154 represents forward monitor.

In an embodiment, the computer system is implemented as computer software executing on a computer system, such as computer system 1000 as shown in FIG. 10, such that the computer system activates a purging system to purge at least one sample 193 from at least one instrument 190 in response to at least one status 164 being a bad status, where one of at least two characteristics 152, 154 represents forward monitor. In an embodiment, the computer system is implemented as computer software executing on a computer system, such as computer system/server 1012 as shown in FIG. 10, such that the computer system activates a purging system to purge at least one sample 193 from at least one instrument 190 in response to at least one status 164 being a bad status, where one of at least two characteristics 152, 154 represents forward monitor. In an embodiment, the computer system is implemented as computer software executing on a computer system, such as processing unit 1016 as shown in FIG. 10, such that the computer system activates a purging system to purge at least one sample 193 from at least one instrument 190 in response to at least one status 164 being a bad status, where one of at least two characteristics 152, 154 represents forward monitor. In an embodiment, the computer system is implemented as computer software executing on a computer system, such as a processor of at least one analytical instrument 190, such that the computer system activates a purging system to purge at least one sample 193 from at least one instrument 190 in response to at least one status 164 being a bad status, where one of at least two characteristics 152, 154 represents forward monitor.

In an embodiment, the computer system activates a purging system to purge at least one sample 193 from at least one instrument 190 in response to at least one status 164 being a bad status, where one of at least two characteristics 152, 154 represents forward monitor, as computer software executing on a processor of the computer system. In an embodiment, the computer system activates a purging system to purge at least one sample 193 from at least one instrument 190 in response to at least one status 164 being a bad status, where one of at least two characteristics 152, 154 represents forward monitor, as computer software executing on a processor of at least one analytical instrument 190. In an embodiment, the computer system is a machine learning computer software/program/algorithm activating a purging system to purge at least one sample 193 from at least one instrument 190 in response to at least one status 164 being a bad status, where one of at least two characteristics 152, 154 represents forward monitor.

Transmitting Status Data

In a further embodiment, the computer implemented method, the system, and the computer program product further include transmitting status data to at least one data sink, where the status data indicates the at least one status, and where the at least one data sink is selected from the group consisting of a telephone, a computer system, a computer database, a computer display, and a logic circuit. In a further embodiment, the computer implemented method, the system, and the computer program product are configured to perform a further operation of transmitting status data to at least one data sink, where the status data indicates the at least one status, and where the at least one data sink is selected from the group consisting of a telephone, a computer system, a computer database, a computer display, and a logic circuit. In an embodiment, the computer system is configured to transmit status data to at least one data sink, where the status data indicates at least one status 164, and where the at least one data sink is selected from the group consisting of a telephone, a computer system, a computer database, a computer display, and a logic circuit.

In an embodiment, the computer system includes a computer system, such as computer system 1000 as shown in FIG. 10, transmitting status data to at least one data sink, where the status data indicates at least one status 164, and where the at least one data sink is selected from the group consisting of a telephone, a computer system, a computer database, a computer display, and a logic circuit. In an embodiment, the computer system includes a computer system, such as computer system/server 1012 as shown in FIG. 10, transmitting status data to at least one data sink, where the status data indicates at least one status 164, and where the at least one data sink is selected from the group consisting of a telephone, a computer system, a computer database, a computer display, and a logic circuit. In an embodiment, the computer system includes a computer system, such as processing unit 1016 as shown in FIG. 10, transmitting status data to at least one data sink, where the status data indicates at least one status 164, and where the at least one data sink is selected from the group consisting of a telephone, a computer system, a computer database, a computer display, and a logic circuit. In an embodiment, the computer system is a processor of at least one analytical instrument 190, transmitting status data to at least one data sink, where the status data indicates at least one status 164, and where the at least one data sink is selected from the group consisting of a telephone, a computer system, a computer database, a computer display, and a logic circuit.

In an embodiment, the computer system is implemented as computer software executing on a computer system, such as computer system 1000 as shown in FIG. 10, such that the computer system transmits status data to at least one data sink, where the status data indicates at least one status 164, and where the at least one data sink is selected from the group consisting of a telephone, a computer system, a computer database, a computer display, and a logic circuit. In an embodiment, the computer system is implemented as computer software executing on a computer system, such as computer system/server 1012 as shown in FIG. 10, such that the computer system transmits status data to at least one data sink, where the status data indicates at least one status 164, and where the at least one data sink is selected from the group consisting of a telephone, a computer system, a computer database, a computer display, and a logic circuit. In an embodiment, the computer system is implemented as computer software executing on a computer system, such as processing unit 1016 as shown in FIG. 10, such that the computer system transmits status data to at least one data sink, where the status data indicates at least one status 164, and where the at least one data sink is selected from the group consisting of a telephone, a computer system, a computer database, a computer display, and a logic circuit. In an embodiment, the computer system is implemented as computer software executing on a computer system, such as a processor of at least one analytical instrument 190, such that the computer system transmits status data to at least one data sink, where the status data indicates at least one status 164, and where the at least one data sink is selected from the group consisting of a telephone, a computer system, a computer database, a computer display, and a logic circuit.

In an embodiment, the computer system transmits status data to at least one data sink, where the status data indicates at least one status 164, and where the at least one data sink is selected from the group consisting of a telephone, a computer system, a computer database, a computer display, and a logic circuit, as computer software executing on a processor of the computer system. In an embodiment, the computer system transmits status data to at least one data sink, where the status data indicates at least one status 164, and where the at least one data sink is selected from the group consisting of a telephone, a computer system, a computer database, a computer display, and a logic circuit, as computer software executing on a processor of at least one analytical instrument 190. In an embodiment, the computer system is a machine learning computer software/program/algorithm transmitting status data to at least one data sink, where the status data indicates at least one status 164, and where the at least one data sink is selected from the group consisting of a telephone, a computer system, a computer database, a computer display, and a logic circuit.

Status Data

In an embodiment, the status data includes at least one of visual data, textual data, audio data, tactile data, olfactory data, and gustatory data. In an particular embodiment, the visual data includes information to render on another display a first graphical user interface object in response to the at least one status being a good status, a second graphical user interface object in response to the at least one status being an intermediate status, and a third graphical user interface object in response to the at least one status being a bad status, and the textual data includes at least one of at least one electronic mail message and at least one electronic text message.

EXAMPLE

Noise Indicator

Figure 6A:
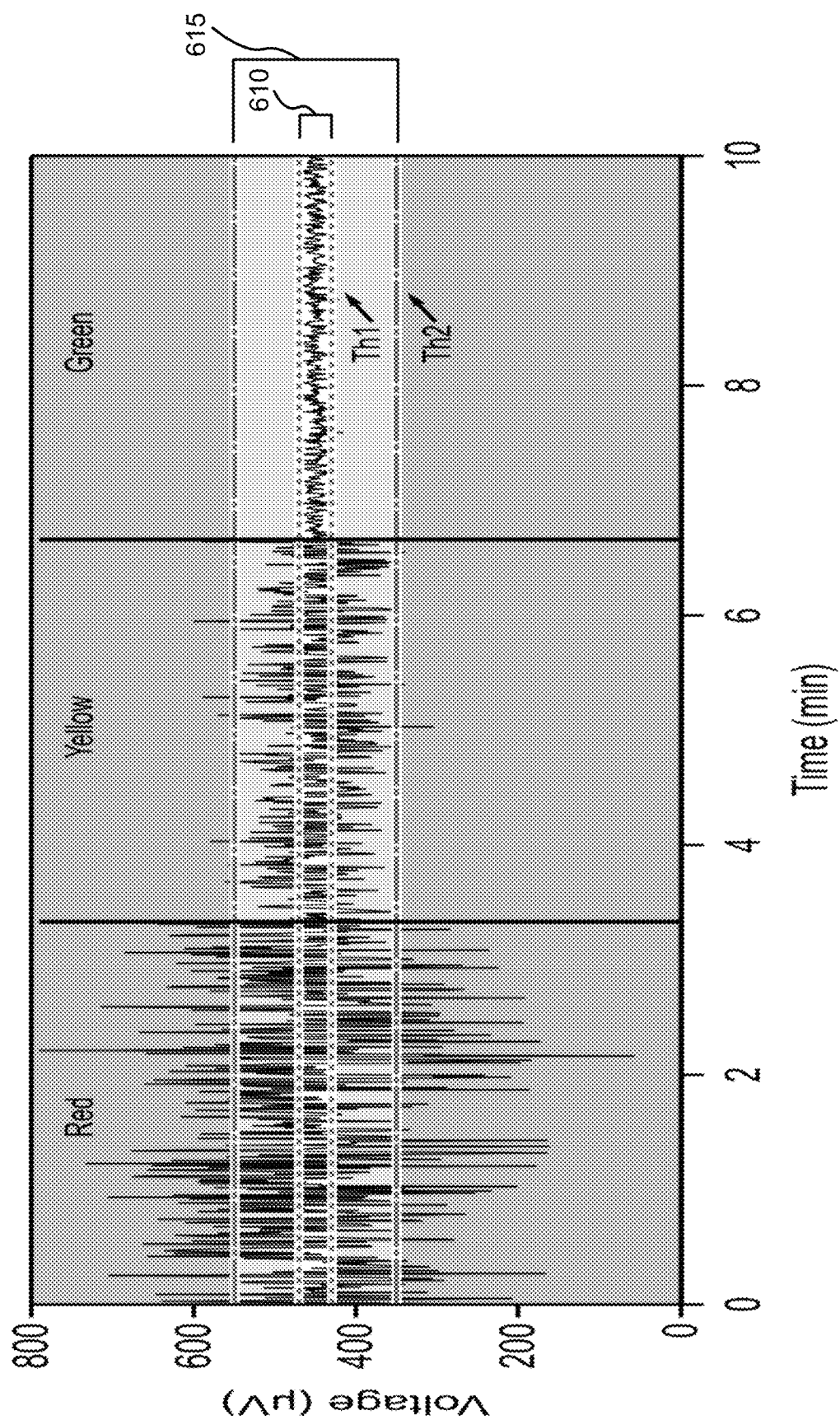
FIG. 6A depicts a graph in accordance with an embodiment.
Figure 7A:
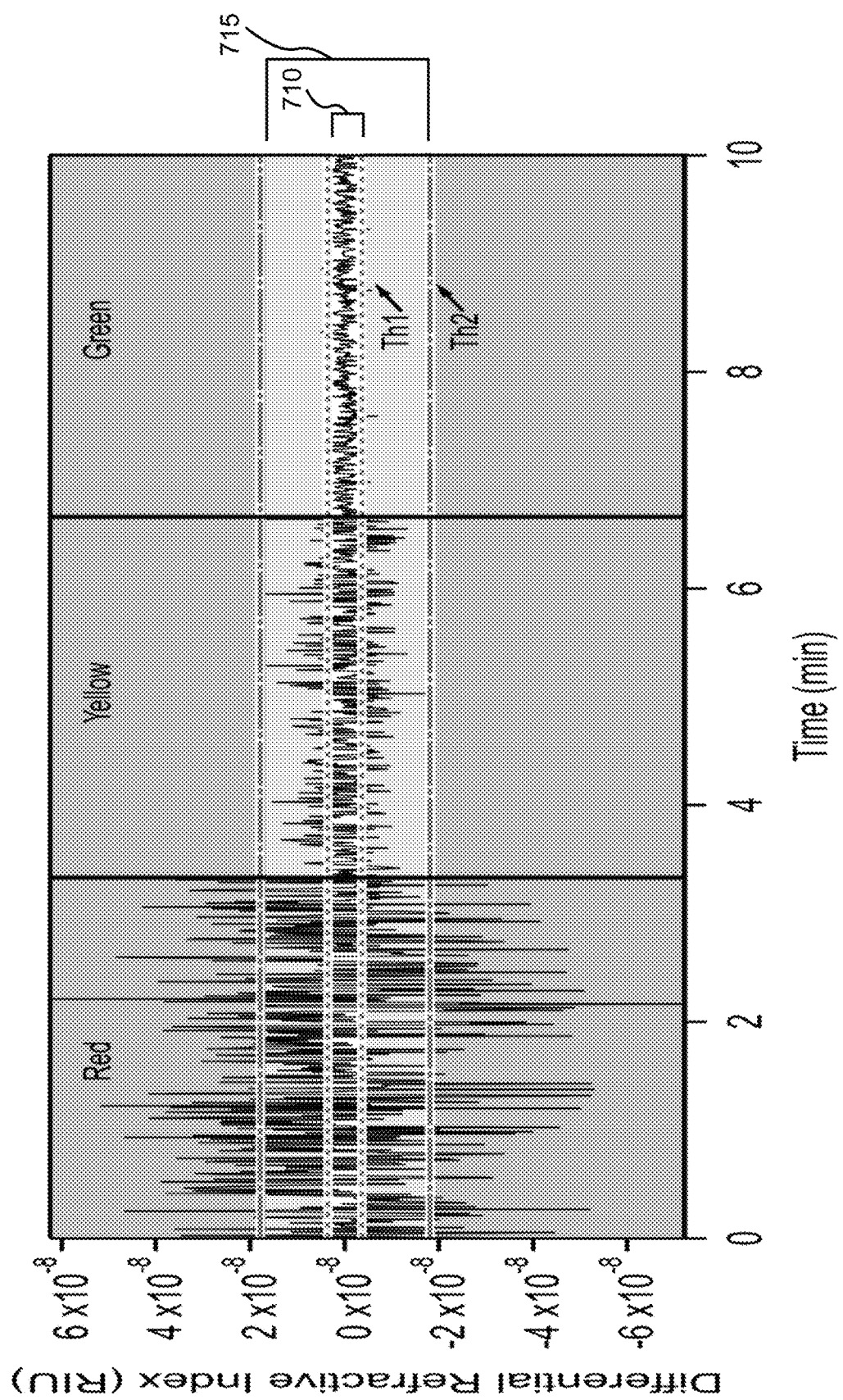
FIG. 7A depicts a graph in accordance with an embodiment.
Figure 8A:
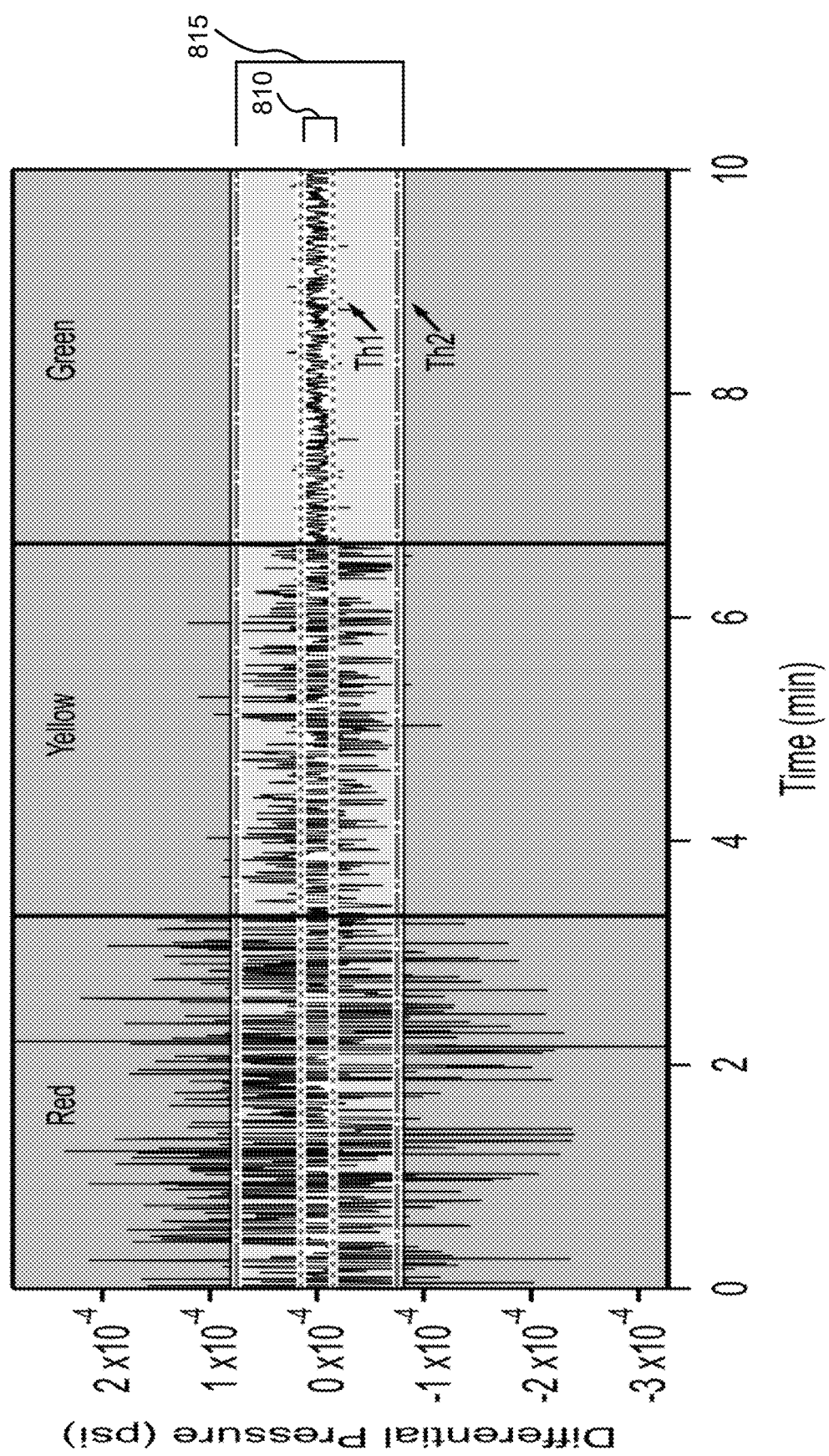
FIG. 8A depicts a graph in accordance with an embodiment.

For example, displayer 146 could denote the phenomenon of noise by displaying on a display of analytical instrument 190 graphical user interface object 525 having a color corresponding to calculated status 164 for analyzed data segments 162 (i.e., noise data segments) and corresponding threshold values 156 (noise threshold values), as depicted in FIG. 6A, FIG. 7A, and FIG. 8A, for a MALS instrument, a differential refractometer, and a viscometer, respectively. Referring to FIG. 6A, for example, for a MALS instrument for the noise phenomenon, a Th1 threshold value/threshold/noise threshold value could range from 2.00E-05 V (i.e., narrow Th1) to 3.00E-05 V (i.e., wide Th1), while a Th2 threshold value/threshold/noise threshold value could range from 1.00E-04 V (i.e., narrow Th2) to 1.50E-04 V (i.e., wide Th2). Thus, for a MALS instrument for the noise phenomenon, as depicted in FIG. 6A, (a) if the amplitude/amplitudes of received data 151 for the noise data segments (i.e., analyzed data segments 162) were within a Th1 threshold value/threshold range 610, then calculator 143 could calculate status 164 to be a good status and displayer 146 could display the first graphical user interface object corresponding to the good status (e.g., green-colored graphical user interface object), (b) if the amplitude/amplitudes of received data 151 for the noise data segments (i.e., analyzed data segments 162) were beyond/outside of Th1 threshold value/threshold range 610 and within a Th2 threshold value/threshold range 615, then calculator 143 could calculate status 164 to be an intermediate status and displayer 146 could display the second graphical user interface object corresponding to the intermediate status (e.g., yellow-colored graphical user interface object), and (c) if the amplitude/amplitudes of received data 151 for the noise data segments (i.e., analyzed data segments 162) were beyond/outside of Th2 threshold value/threshold range 615, then calculator 143 could calculate status 164 to be a bad status and displayer 146 could display the third graphical user interface object corresponding to the bad status (e.g., red-colored graphical user interface object).

Referring to FIG. 7A, for example, for a first type of differential refractometer for the noise phenomenon, a Th1 threshold value/threshold/noise threshold value could range from 3.60E-09 RIU (i.e., narrow Th1) to 5.40E-09 RIU (i.e., wide Th1), while a Th2 threshold value/threshold/noise threshold value could range from 1.80E-08 RIU (i.e., narrow Th2) to 2.70E-08 RIU (i.e., wide Th2). Thus, for a first type of differential refractometer for the noise phenomenon, as depicted in FIG. 7A, (a) if the amplitude/amplitudes of received data 151 for the noise data segments (i.e., analyzed data segments 162) were within a Th1 threshold value/threshold range 710, then calculator 143 could calculate status 164 to be a good status and displayer 146 could display the first graphical user interface object corresponding to the good status (e.g., green-colored graphical user interface object), (b) if the amplitude/amplitudes of received data 151 for the noise data segments (i.e., analyzed data segments 162) were beyond/outside of Th1 threshold value/threshold range 710 and within a Th2 threshold value/threshold range 715, then calculator 143 could calculate status 164 to be an intermediate status and displayer 146 could display the second graphical user interface object corresponding to the intermediate status (e.g., yellow-colored graphical user interface object), and (c) if the amplitude/amplitudes of received data 151 for the noise data segments (i.e., analyzed data segments 162) were beyond/outside of Th2 threshold value/threshold range 715, then calculator 143 could calculate status 164 to be a bad status and displayer 146 could display the third graphical user interface object corresponding to the bad status (e.g., red-colored graphical user interface object).

Referring to FIG. 7A, for example, for a second type of differential refractometer for the noise phenomenon, a Th1 threshold value/threshold/noise threshold value could range from 7.20E-09 RIU (i.e., narrow Th1) to 1.08E-08 RIU (i.e., wide Th1), while a Th2 threshold value/threshold/noise threshold value could range from 3.60E-08 RIU (i.e., narrow Th2) to 5.40E-08 RIU (i.e., wide Th2). Thus, for a second type of differential refractometer for the noise phenomenon, as depicted in FIG. 7A, (a) if the amplitude/amplitudes of received data 151 for the noise data segments (i.e., analyzed data segments 162) were within a Th1 threshold value/threshold range 710, then calculator 143 could calculate status 164 to be a good status and displayer 146 could display the first graphical user interface object corresponding to the good status (e.g., green-colored graphical user interface object), (b) if the amplitude/amplitudes of received data 151 for the noise data segments (i.e., analyzed data segments 162) were beyond/outside of Th1 threshold value/threshold range 710 and within a Th2 threshold value/threshold range 715, then calculator 143 could calculate status 164 to be an intermediate status and displayer 146 could display the second graphical user interface object corresponding to the intermediate status (e.g., yellow-colored graphical user interface object), and (c) if the amplitude/amplitudes of received data 151 for the noise data segments (i.e., analyzed data segments 162) were beyond/ outside of Th2 threshold value/threshold range 715, then calculator 143 could calculate status 164 to be a bad status and displayer 146 could display the third graphical user interface object corresponding to the bad status (e.g., red-colored graphical user interface object).

Referring to FIG. 8A, for example, for a viscometer for the noise phenomenon, a Th1 threshold value/threshold/noise threshold value could range from 4.40E-05 psi (i.e., narrow Th1) to 6.60E-05 psi (i.e., wide Th1), while a Th2 threshold value/threshold/noise threshold value could range from 2.20E-04 psi (i.e., narrow Th2) to 3.30E-04 psi (i.e., wide Th2). Thus, for a viscometer for the noise phenomenon, as depicted in FIG. 8A, (a) if the amplitude/amplitudes of received data 151 for the noise data segments (i.e., analyzed data segments 162) were within a Th1 threshold value/threshold range 810, then calculator 143 could calculate status 164 to be a good status and displayer 146 could display the first graphical user interface object corresponding to the good status (e.g., green-colored graphical user interface object), (b) if the amplitude/amplitudes of received data 151 for the noise data segments (i.e., analyzed data segments 162) were beyond/outside of Th1 threshold value/threshold range 810 and within a Th2 threshold value/threshold range 815, then calculator 143 could calculate status 164 to be an intermediate status and displayer 146 could display the second graphical user interface object corresponding to the intermediate status (e.g., yellow-colored graphical user interface object), and (c) if the amplitude/amplitudes of received data 151 for the noise data segments (i.e., analyzed data segments 162) were beyond/outside of Th2 threshold value/threshold range 815, then calculator 143 could calculate status 164 to be a bad status and displayer 146 could display the third graphical user interface object corresponding to the bad status (e.g., red-colored graphical user interface object).

Wander Indicator

Figure 6B:
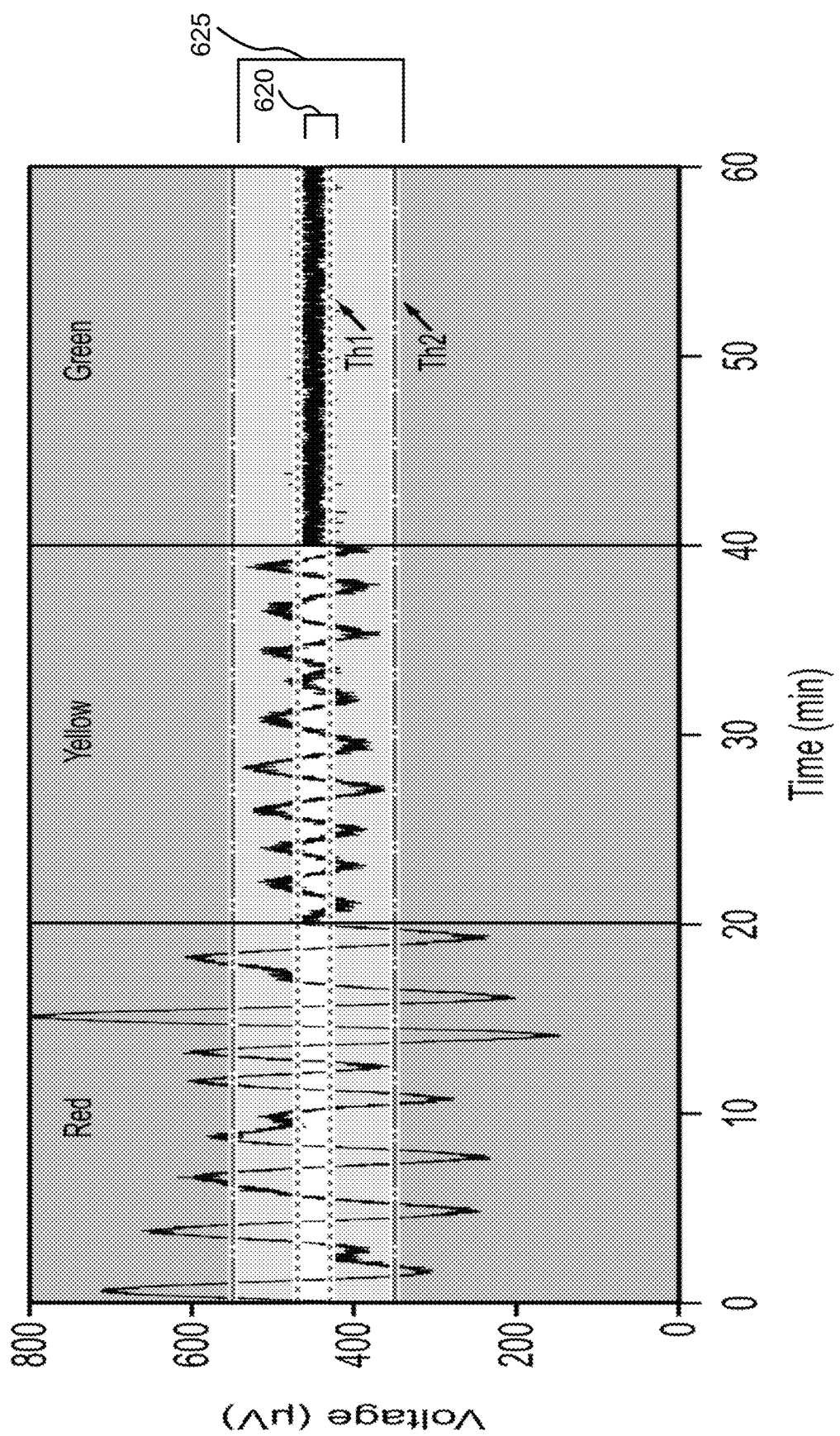
FIG. 6B depicts a graph in accordance with an embodiment.
Figure 7B:
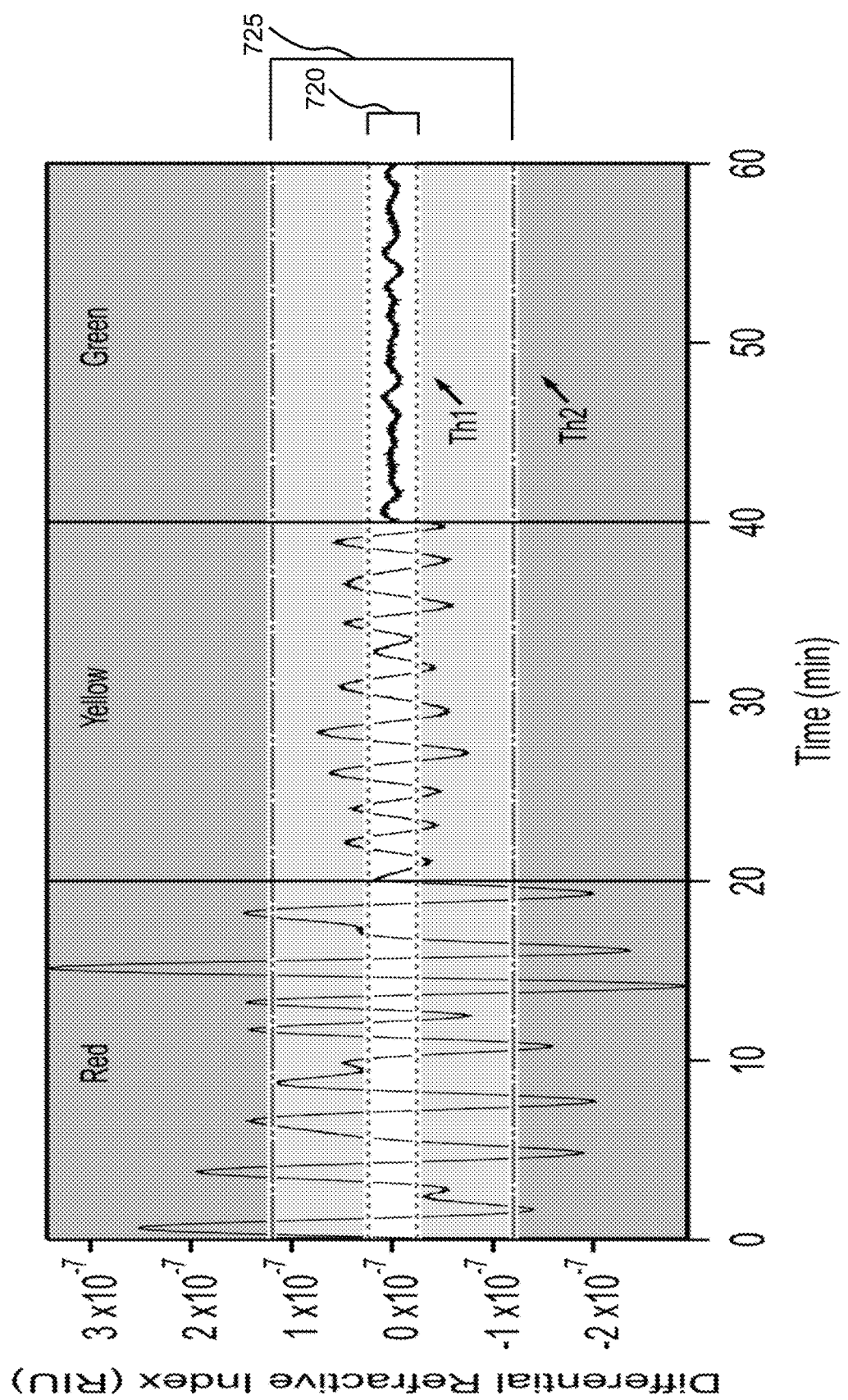
FIG. 7B depicts a graph in accordance with an embodiment.
Figure 8B:
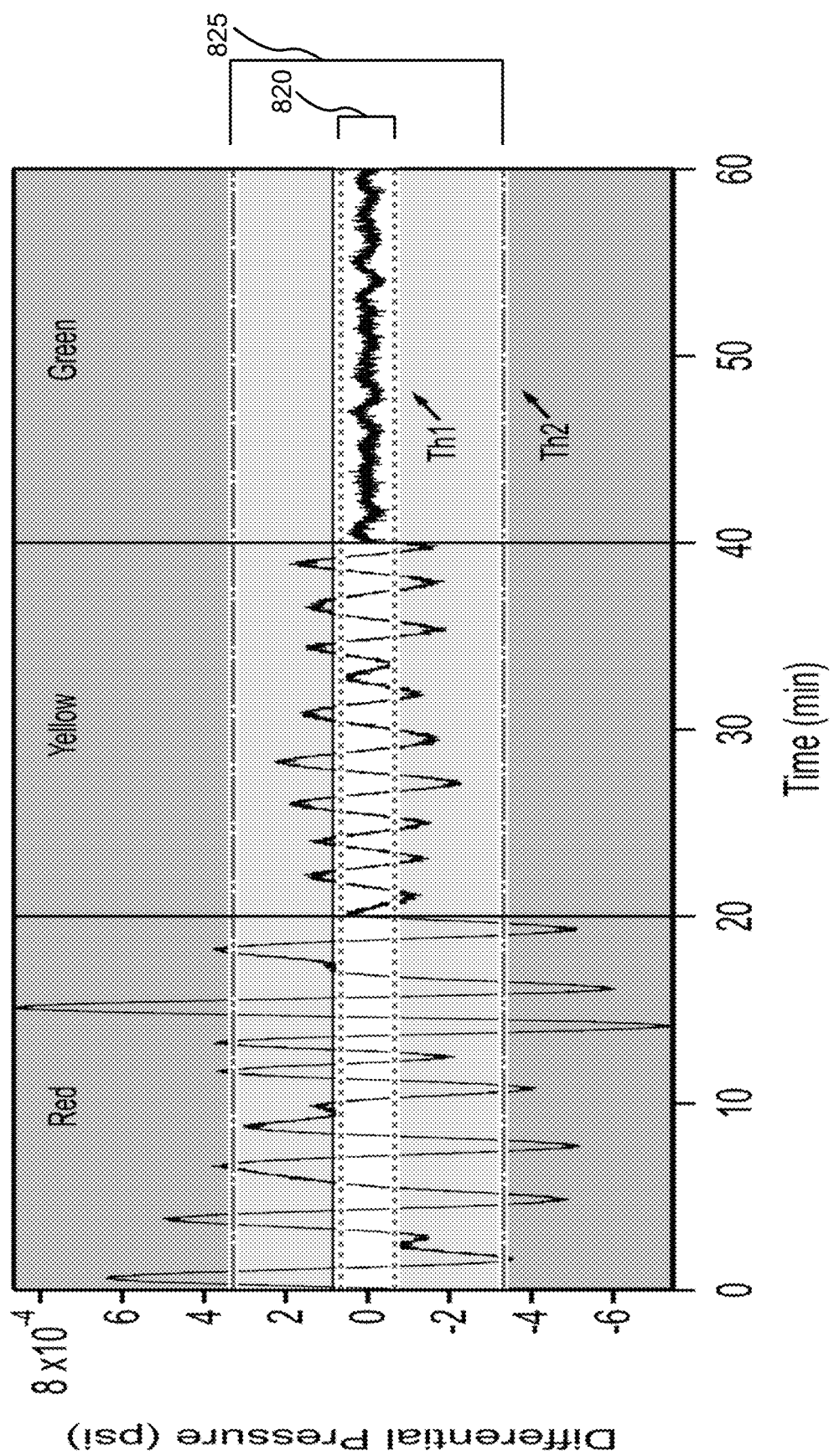
FIG. 8B depicts a graph in accordance with an embodiment.

For example, displayer 146 could denote the phenomenon of wander by displaying on a display of analytical instrument 190 graphical user interface object 525 having a color corresponding to calculated status 164 for analyzed data segments 162 (i.e., wander data segments) and corresponding threshold values 156 (wander threshold values), as depicted in FIG. 6B, FIG. 7B, and FIG. 8B, for a MALS instrument, a differential refractometer, and a viscometer, respectively. Referring to FIG. 6B, for example, for a MALS instrument for the wander phenomenon, a Th1 threshold value/threshold/wander threshold value could range from 2.00E-05 V (i.e., narrow Th1) to 3.00E-05 V (i.e., wide Th1), while a Th2 threshold value/threshold/wander threshold value could range from 1.00E-04 V (i.e., narrow Th2) to 1.50E-04 V (i.e., wide Th2). Thus, for a MALS instrument for the wander phenomenon, as depicted in FIG. 6B, (a) if the amplitude/amplitudes of received data 151 for the noise data segments (i.e., analyzed data segments 162) were within a Th1 threshold value/threshold range 620, then calculator 143 could calculate status 164 to be a good status and displayer 146 could display the first graphical user interface object corresponding to the good status (e.g., green-colored graphical user interface object), (b) if the amplitude/amplitudes of received data 151 for the noise data segments (i.e., analyzed data segments 162) were beyond/outside of Th1 threshold value/threshold range 620 and within a Th2 threshold value/threshold range 625, then calculator 143 could calculate status 164 to be an intermediate status and displayer 146 could display the second graphical user interface object corresponding to the intermediate status (e.g., yellow-colored graphical user interface object), and (c) if the amplitude/amplitudes of received data 151 for the noise data segments (i.e., analyzed data segments 162) were beyond/outside of Th2 threshold value/threshold range 625, then calculator 143 could calculate status 164 to be a bad status and displayer 146 could display the third graphical user interface object corresponding to the bad status (e.g., red-colored graphical user interface object).

Referring to FIG. 7B, for example, for first and second types of differential refractometer for the wander phenomenon, a Th1 threshold value/threshold/wander threshold value could range from 2.40E-08 MU (i.e., narrow Th1) to 3.60E-08 RIU (i.e., wide Th1), while a Th2 threshold value/threshold/wander threshold value could range from 1.20E-07 MU (i.e., narrow Th2) to 1.80E-07 RIU (i.e., wide Th2). Thus, for the first and second types of differential refractometer for the wander phenomenon, as depicted in FIG. 7B, (a) if the amplitude/amplitudes of received data 151 for the noise data segments (i.e., analyzed data segments 162) were within a Th1 threshold value/threshold range 720, then calculator 143 could calculate status 164 to be a good status and displayer 146 could display the first graphical user interface object corresponding to the good status (e.g., green-colored graphical user interface object), (b) if the amplitude/amplitudes of received data 151 for the noise data segments (i.e., analyzed data segments 162) were beyond/outside of Th1 threshold value/threshold range 720 and within a Th2 threshold value/threshold range 725, then calculator 143 could calculate status 164 to be an intermediate status and displayer 146 could display the second graphical user interface object corresponding to the intermediate status (e.g., yellow-colored graphical user interface object), and (c) if the amplitude/amplitudes of received data 151 for the noise data segments (i.e., analyzed data segments 162) were beyond/outside of Th2 threshold value/threshold range 725, then calculator 143 could calculate status 164 to be a bad status and displayer 146 could display the third graphical user interface object corresponding to the bad status (e.g., red-colored graphical user interface object).

Referring to FIG. 8B, for example, for a viscometer for the wander phenomenon, a Th1 threshold value/threshold/wander threshold value could range from 2.00E-04 psi (i.e., narrow Th1) to 3.00E-04 psi (i.e., wide Th1), while a Th2 threshold value/threshold/wander threshold value could range from 1.00E-03 psi (i.e., narrow Th2) to 1.50E-03 psi (i.e., wide Th2). Thus, for a viscometer for the wander phenomenon, as depicted in FIG. 8B, (a) if the amplitude/amplitudes of received data 151 for the noise data segments (i.e., analyzed data segments 162) were within a Th1 threshold value/threshold range 820, then calculator 143 could calculate status 164 to be a good status and displayer 146 could display the first graphical user interface object corresponding to the good status (e.g., green-colored graphical user interface object), (b) if the amplitude/amplitudes of received data 151 for the noise data segments (i.e., analyzed data segments 162) were beyond/outside of Th1 threshold value/threshold range 820 and within a Th2 threshold value/threshold range 825, then calculator 143 could calculate status 164 to be an intermediate status and displayer 146 could display the second graphical user interface object corresponding to the intermediate status (e.g., yellow-colored graphical user interface object), and (c) if the amplitude/amplitudes of received data 151 for the noise data segments (i.e., analyzed data segments 162) were beyond/outside of Th2 threshold value/threshold range 825, then calculator 143 could calculate status 164 to be a bad status and displayer 146 could display the third graphical user interface object corresponding to the bad status (e.g., red-colored graphical user interface object).

Drift Indicator

Figure 6C:
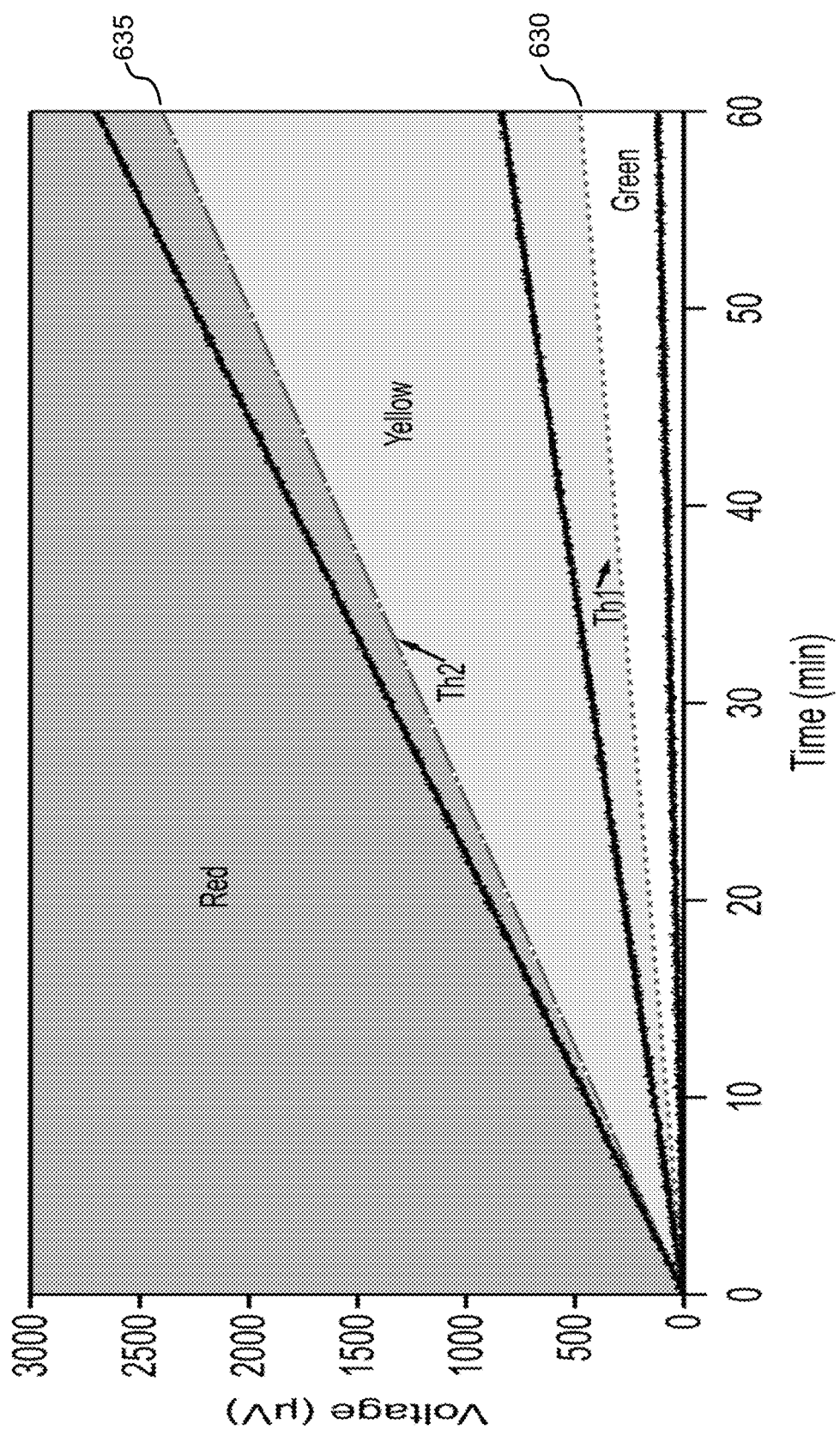
FIG. 6C depicts a graph in accordance with an embodiment.
Figure 7C:
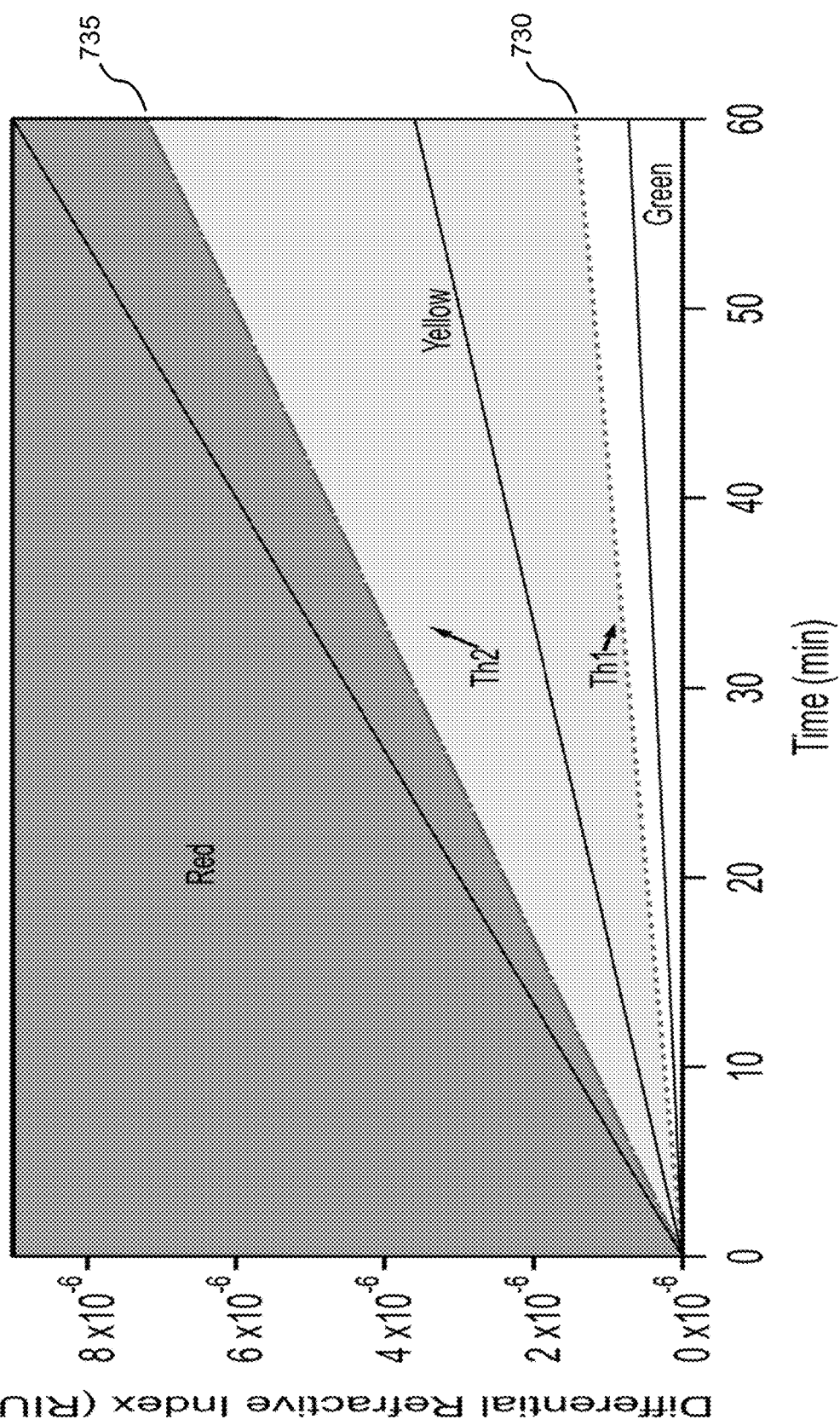
FIG. 7C depicts a graph in accordance with an embodiment.
Figure 8C:
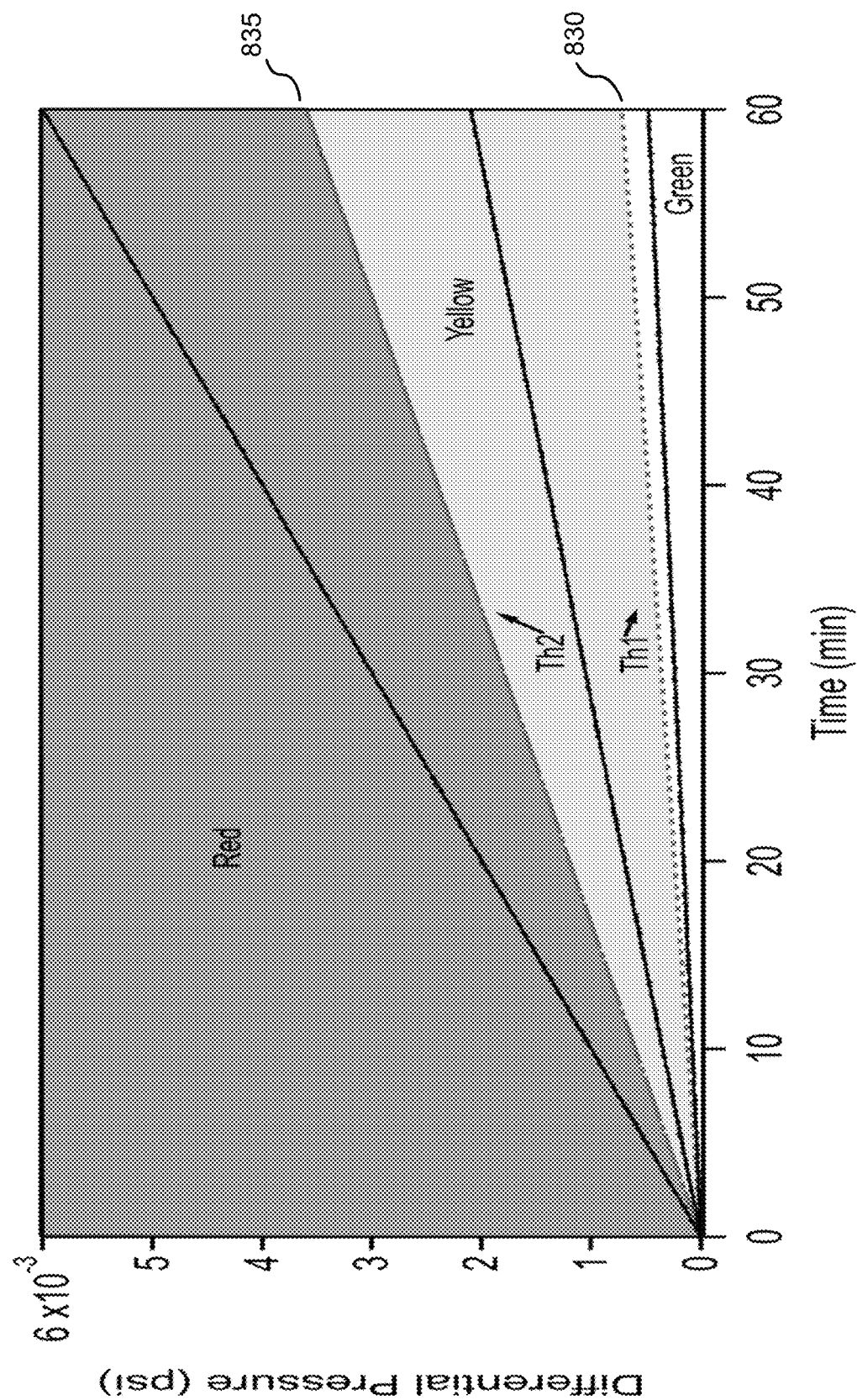
FIG. 8C depicts a graph in accordance with an embodiment.

For example, displayer 146 could denote the phenomenon of drift by displaying on a display of analytical instrument 190 graphical user interface object 525 having a color corresponding to calculated status 164 for analyzed data segments 162 (i.e., drift data segments) and corresponding threshold values 156 (drift threshold values), as depicted in FIG. 6C, FIG. 7C and FIG. 8C, for a MALS instrument, a differential refractometer, and a viscometer, respectively. Referring to FIG. 6C, for example, for a MALS instrument for the drift phenomenon, a Th1 threshold value/threshold slope/drift threshold value could range from 8.00E-06 V/min (i.e., narrow Th1) to 1.20E-05 V/min (i.e., wide Th1), while a Th2 threshold value/threshold slope/drift threshold value could range from 4.00E-05 V/min (i.e., narrow Th2) to 6.00E-05 V/min (i.e., wide Th2). Thus, for a MALS instrument for the drift phenomenon, as depicted in FIG. 6C, (a) if the slope/slopes of received data 151 for the drift data segments (i.e., analyzed data segments 162) were less than or equal to a Th1 threshold value/threshold slope 630, then calculator 143 could calculate status 164 to be a good status and displayer 146 could display the first graphical user interface object corresponding to the good status (e.g., green-colored graphical user interface object), (b) if the slope/slopes of received data 151 for the drift data segments (i.e., analyzed data segments 162) were greater than Th1 threshold value/threshold slope 630 and less than or equal to a Th2 threshold value/threshold slope 635, then calculator 143 could calculate status 164 to be an intermediate status and displayer 146 could display the second graphical user interface object corresponding to the intermediate status (e.g., yellow-colored graphical user interface object), and (c) if the slope/slopes of received data 151 for the drift data segments (i.e., analyzed data segments 162) were greater than Th2 threshold value/threshold slope 635, then calculator 143 could calculate status 164 to be a bad status and displayer 146 could display the third graphical user interface object corresponding to the bad status (e.g., red-colored graphical user interface object).

Referring to FIG. 7C, for example, for the first and second types of differential refractometer for the drift phenomenon, a Th1 threshold value/threshold slope/drift threshold value could range from 2.40E-08 RIU/min (i.e., narrow Th1) to 3.60E-08 RIU/min (i.e., wide Th1), while a Th2 threshold value/threshold slope/drift threshold value could range from 1.20E-07 RIU/min (i.e., narrow Th2) to 1.80E-07 RIU/min (i.e., wide Th2). Thus, for the first and second types of differential refractometer for the drift phenomenon, as depicted in FIG. 7C, (a) if the slope/slopes of received data 151 for the drift data segments (i.e., analyzed data segments 162) were less than or equal to a Th1 threshold value/threshold slope 730, then calculator 143 could calculate status 164 to be a good status and displayer 146 could display the first graphical user interface object corresponding to the good status (e.g., green-colored graphical user interface object), (b) if the slope/slopes of received data 151 for the drift data segments (i.e., analyzed data segments 162) were greater than Th1 threshold value/threshold slope 730 and less than or equal to a Th2 threshold value/threshold slope 735, then calculator 143 could calculate status 164 to be an intermediate status and displayer 146 could display the second graphical user interface object corresponding to the intermediate status (e.g., yellow-colored graphical user interface object), and (c) if the slope/slopes of received data 151 for the drift data segments (i.e., analyzed data segments 162) were greater than Th2 threshold value/threshold slope 735, then calculator 143 could calculate status 164 to be a bad status and displayer 146 could display the third graphical user interface object corresponding to the bad status (e.g., red-colored graphical user interface object).

Referring to FIG. 8C, for example, for a viscometer for the drift phenomenon, a Th1 threshold value/threshold slope/drift threshold value could range from 1.20E-05 psi/min (i.e., narrow Th1) to 1.80E-05 psi/min (i.e., wide Th1), while a Th2 threshold value/threshold slope/drift threshold value could range from 6.00E-05 psi/min (i.e., narrow Th2) to 9.00E-05 psi/min (i.e., wide Th2). Thus, for a viscometer for the drift phenomenon, as depicted in FIG. 8C, (a) if the slope/slopes of received data 151 for the drift data segments (i.e., analyzed data segments 162) were less than or equal to a Th1 threshold value/threshold slope 830, then calculator 143 could calculate status 164 to be a good status and displayer 146 could display the first graphical user interface object corresponding to the good status (e.g., green-colored graphical user interface object), (b) if the slope/slopes of received data 151 for the drift data segments (i.e., analyzed data segments 162) were greater than Th1 threshold value/threshold slope 830 and less than or equal to a Th2 threshold value/threshold slope 835, then calculator 143 could calculate status 164 to be an intermediate status and displayer 146 could display the second graphical user interface object corresponding to the intermediate status (e.g., yellow-colored graphical user interface object), and (c) if the slope/slopes of received data 151 for the drift data segments (i.e., analyzed data segments 162) were greater than Th2 threshold value/threshold slope 835, then calculator 143 could calculate status 164 to be a bad status and displayer 146 could display the third graphical user interface object corresponding to the bad status (e.g., red-colored graphical user interface object).

Forward Monitor Indicator

Figure 9:
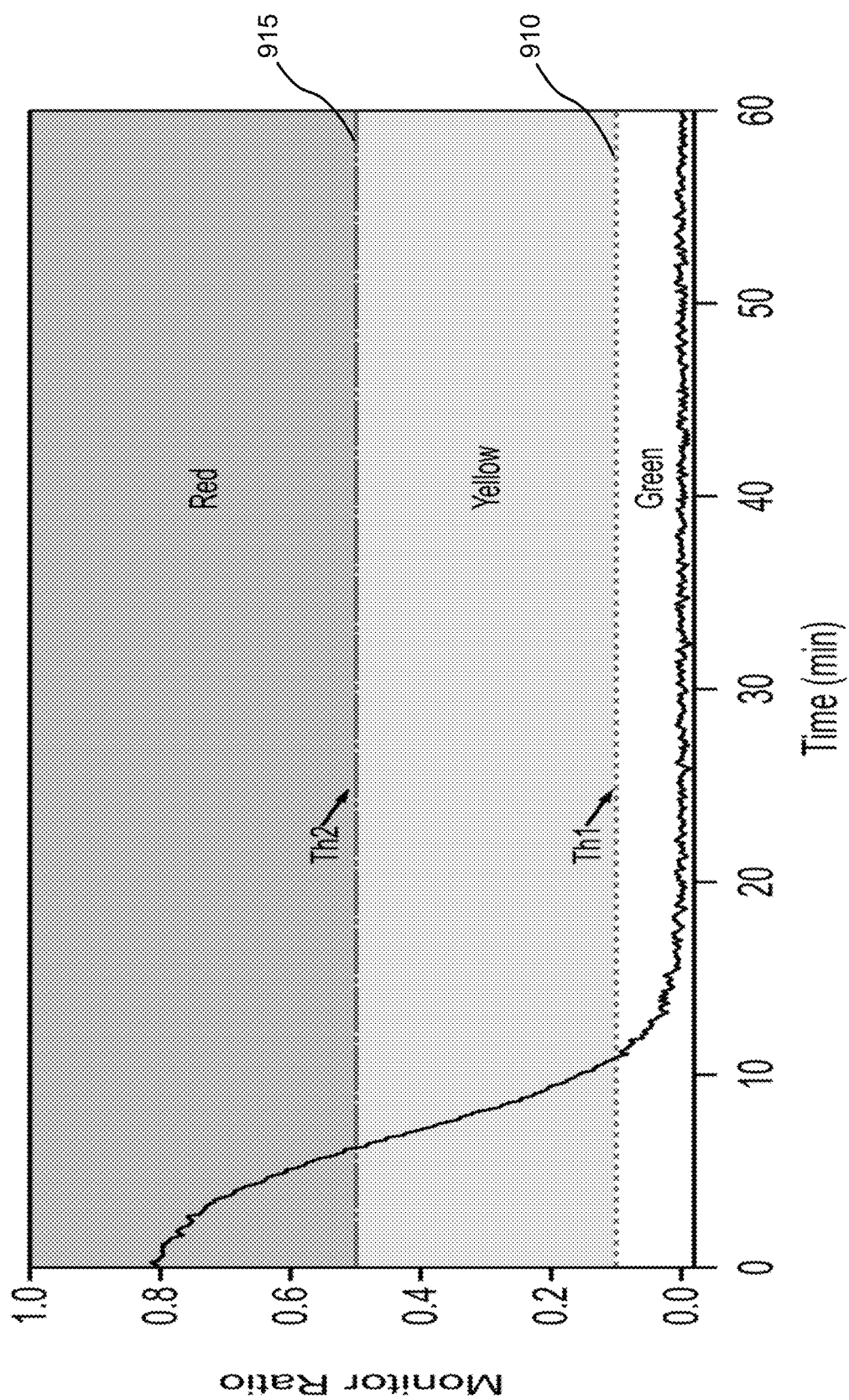
FIG. 9 depicts a graph in accordance with an embodiment.

For example, displayer 146 could denote the phenomenon of a possible flow cell obstruction or sample absorption as indicated by a forward monitor (FMON) indicator of analytical instrument 190, by displaying graphical user interface object 525 on a display of analytical instrument 190 with respect to the following ratio:

$$|LM-FM|/LM$$

as depicted in FIG. 9, where LM is a signal from a left monitor coupled to instrument 190 (e.g., a MALS instrument) and FM is a signal from a forward monitor coupled to instrument 190. If this ratio were less than or equal to a Th1 threshold value/threshold/FMON threshold value 910 (e.g., 0.1) for at least X seconds (e.g., 10 seconds), then displayer 146 could display the first graphical user interface object (e.g., green-colored graphical user interface object), indicating a good status. If this ratio were greater than Th1 threshold value/threshold/FMON threshold value 910 (e.g., 0.1) and less than or equal to a Th2 threshold value/threshold/FMON threshold value 915 (e.g., 0.5) for at least X seconds (e.g., 10 seconds), then displayer 146 could display the second graphical user interface object (e.g., yellow-colored graphical user interface object), indicating an intermediate/caution status. If this ratio were greater than Th2 threshold value/threshold/FMON threshold value 915 (e.g., 0.5) for at least X seconds (e.g., 10 seconds), then displayer 146 could display the third graphical user interface object (e.g., a red-colored graphical user interface object), indicating a bad/low status.

Computer System

In an exemplary embodiment, the computer system is a computer system 1000 as shown in FIG. 10. Computer system 1000 is only one example of a computer system and is not intended to suggest any limitation as to the scope of use or functionality of embodiments of the present invention. Regardless, computer system 1000 is capable of being implemented to perform and/or performing any of the functionality/operations of the present invention.

Computer system 1000 includes a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 1012 may be described in the general context of computer system-executable instructions, such as program modules, being executed by a computer system. Generally, program modules may include routines, programs, objects, components, logic, and/or data structures that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1012 in computer system 1000 is shown in the form of a general-purpose computing device. The components of computer system/server 1012 may include, but are not limited to, one or more processors or processing units 1016, a system memory 1028, and a bus 1018 that couples various system components including system memory 1028 to processor 1016.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1012 typically includes a variety of computer system readable media. Such media may be any available media that is accessible by computer system/server 1012, and includes both volatile and non-volatile media, removable and non-removable media.

System memory 1028 can include computer system readable media in the form of volatile memory, such as random access memory (RAM) 1030 and/or cache memory 1032. Computer system/server 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions/operations of embodiments of the invention.

Program/utility 1040, having a set (at least one) of program modules 1042, may be stored in memory 1028 by way of example, and not limitation. Exemplary program modules 1042 may include an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the present invention.

Computer system/server 1012 may also communicate with one or more external devices 1014 such as a keyboard, a pointing device, a display 1024, one or more devices that enable a user to interact with computer system/server 1012, and/or any devices (e.g., network card, modem, etc.) that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, tape drives, and data archival storage systems.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method comprising:
receiving, by a computer system, data from at least one analytical instrument monitoring at least one liquid sample;
executing, by the computer system, a set of logical operations segmenting the received data into data segments for three characteristics of at least one of the at least one analytical instrument, the at least one liquid sample, and at least one operating environment of the at least one analytical instrument,
wherein the three characteristics are noise, wander, and drift, and
wherein the data segments comprise
0-second to 30-second data segments for noise,
30-second to 5-minute data segments for wander, and 5-minute to n-minute data segments for drift, wherein n is a number less than or equal to 10;

executing, by the computer system, a set of logical operations analyzing each of the data segments for the three characteristics, resulting in analyzed data segments;

retrieving, by the computer system, threshold values for the three characteristics from a computer data source;

calculating, by the computer system, at least one status of at least one of the at least one analytical instrument, the at least one liquid sample, and the at least one operating environment, with respect to the analyzed data segments and the threshold values;

displaying, by the computer system, the at least one status on at least one display of the at least one analytical instrument; and executing, by the computer system, a set of logical operations changing at least one operational state of the at least one analytical instrument with respect to the at least one status.

2. The method of claim 1 wherein the at least one analytical instrument comprises a multi-angle light scattering instrument, and wherein the received data indicates time-varying light levels of scattered light, wherein the light levels are derived from at least one measurement of the at least one liquid sample by the multi-angle light scattering instrument.

3. The method of claim 2 wherein the received data comprises time-varying light level readings from at least a 90-degree photodiode of the multi-angle light scattering instrument.

4. The method of claim 2 wherein the received data comprises time-varying light level readings from at least a 0-degree photodiode of the multi-angle light scattering instrument.

5. The method of claim 1 wherein the at least one analytical instrument comprises a multi-angle light scattering instrument, and wherein the received data indicates electrical noise from the multi-angle light scattering instrument.

6. The method of claim 1 wherein the at least one instrument comprises a differential refractometer, and wherein the received data indicates time-varying differential refractive index values, wherein the differential refractive index values are derived from at least one measurement of the at least one sample by the differential refractometer.

7. The method of claim 1 wherein the at least one instrument comprises a viscometer, and wherein the received data indicates time-varying differential pressure values, wherein the differential pressure values are derived from at least one measurement of the at least one sample by the viscometer.

8. The method of claim 1 wherein the displaying comprises:

displaying a first graphical user interface object in response to the at least one status being a good status;

displaying a second graphical user interface object in response to the at least one status being an intermediate status; and displaying a third graphical user interface object in response to the at least one status being a bad status.

9. The method of claim 1 wherein the changing comprises activating a cleaning system to clean the at least one analytical instrument in response to the at least one status being at least one of an intermediate status and a bad status, wherein the at least two characteristics represent noise and wander.

10. The method of claim 1 wherein the changing comprises activating a purging system to purge the at least one liquid sample from the at least one analytical instrument in response to the at least one status being at least one of an intermediate status and a bad status, wherein one of the at least two characteristics represents drift.

11. The method of claim 1 wherein the changing comprises activating a purging system to purge the at least one liquid sample from the at least one analytical instrument in response to the at least one status being a bad status, wherein one of the at least two characteristics represents a signal from a forward monitor sensor.

12. The method of claim 1 further comprising transmitting status data to at least one data sink, wherein the status data indicates the at least one status, and wherein the at least one data sink is selected from the group consisting of a telephone, a computer system, a computer database, a computer display, and a logic circuit.

13. The method of claim 12 wherein the status data comprises at least one of visual data, textual data, audio data, tactile data, olfactory data, and gustatory data.

14. The method of claim 13 wherein the visual data comprises information to render on another display a first graphical user interface object in response to the at least one status being a good status, a second graphical user interface object in response to the at least one status being an intermediate status, and a third graphical user interface object in response to the at least one status being a bad status, and wherein the textual data comprises at least one of at least one electronic mail message and at least one electronic text message.

15. The method of claim 1 wherein the received data indicates at least one alarm state from the at least one analytical instrument.

16. A system comprising:

a memory; and a processor in communication with the memory, the processor configured to perform a method comprising receiving data from at least one analytical instrument monitoring at least one liquid sample, executing a set of logical operations segmenting the received data into data segments for three characteristics of at least one of the at least one analytical instrument, the at least one liquid sample, and at least one operating environment of the at least one analytical instrument, wherein the three characteristics are noise, wander, and drift, and wherein the data segments comprise 0-second to 30-second data segments for noise, 30-second to 5-minute data segments for wander, and 5-minute to n-minute data segments for drift, wherein n is a number less than or equal to 10, executing a set of logical operations analyzing each of the data segments for the three characteristics, resulting in analyzed data segments, retrieving threshold values for the three characteristics from a computer data source, calculating at least one status of at least one of the at least one analytical instrument, the at least one liquid sample, and the at least one operating environment, with respect to the analyzed data segments and the threshold values, displaying the at least one status on at least one display of the at least one analytical instrument, and executing a set of logical operations changing at least one operational state of the at least one analytical instrument with respect to the at least one status.

17. A computer program product comprising a non-transitory computer readable storage medium having program instructions embodied therewith, the program instructions executable by a processor to cause the processor to perform a method comprising:

receiving data from at least one analytical instrument monitoring at least one liquid sample;

executing a set of logical operations segmenting the received data into data segments for three characteristics of at least one of the at least one analytical instrument, the at least one liquid sample, and at least one operating environment of the at least one analytical instrument, wherein the three characteristics are noise, wander, and drift, and wherein the data segments comprise
0-second to 30-second data segments for noise,
30-second to 5-minute data segments for wander, and
5-minute to n-minute data segments for drift, wherein n is a number less than or equal to 10r;

executing a set of logical operations analyzing each of the data segments for the three characteristics, resulting in analyzed data segments;

retrieving threshold values for the three characteristics from a computer data source;

calculating at least one status of at least one of the at least one analytical instrument, the at least one liquid sample, and the at least one operating environment, with respect to the analyzed data segments and the threshold values;

displaying the at least one status on at least one display of the at least one analytical instrument; and executing a set of logical operations changing at least one operational state of the at least one analytical instrument with respect to the at least one status.

* * * * *